US012323756B2

(12) United States Patent
Yu

(10) Patent No.: US 12,323,756 B2
(45) Date of Patent: Jun. 3, 2025

(54) IN-EAR WEARABLE DEVICE

(71) Applicant: Listening Wisdom (Nanjing) Technology Co., Ltd., Nanjing (CN)

(72) Inventor: Chunhong Yu, Nanjing (CN)

(73) Assignee: Listening Wisdom (Nanjing) Technology Co., Ltd., Nanjing (CN)

( * ) Notice: Subject to any disclaimer, the term of this patent is extended or adjusted under 35 U.S.C. 154(b) by 259 days.

(21) Appl. No.: 18/187,998

(22) Filed: Mar. 22, 2023

(65) Prior Publication Data

US 2023/0308793 A1 Sep. 28, 2023

(30) Foreign Application Priority Data

Mar. 22, 2022 (CN) ......................... 202210286056.2

(51) Int. Cl.
*H04R 25/00* (2006.01)
*H04R 1/10* (2006.01)

(52) U.S. Cl.
CPC ....... *H04R 1/1016* (2013.01); *H04R 2420/07* (2013.01); *H04R 2460/11* (2013.01)

(58) Field of Classification Search
CPC .................................................... H04R 1/1016
See application file for complete search history.

(56) References Cited

U.S. PATENT DOCUMENTS

| | | | |
|---|---|---|---|
| 6,549,635 B1 | 4/2003 | Gebert | |
| 2009/0041281 A1* | 2/2009 | Chang | H04R 1/2811 381/345 |
| 2009/0071486 A1* | 3/2009 | Perez | H04R 25/652 128/858 |

(Continued)

FOREIGN PATENT DOCUMENTS

| | | |
|---|---|---|
| CA | 3116708 A1 | 5/2020 |
| CH | 694932 A5 | 9/2005 |

(Continued)

OTHER PUBLICATIONS

Communication from China National Intellectual Property Administration with Search Report of CN Patent Application No. 202210286056.2, dated Aug. 19, 2024.

(Continued)

*Primary Examiner* — Simon King

(74) *Attorney, Agent, or Firm* — Cherskov Flaynik & Gurda, LLC

(57) ABSTRACT

The disclosure relates to an in-ear wearable device, including: a customized housing having a housing wall and an inner cavity, the customized housing comprising a first portion for being inserted into an user's acoustic meatus and a second portion for being exposed to the external when in use; a panel mounted to the customized housing; a ventilation hole at least partially disposed in the customized housing and partially formed in the housing wall; and a ventilation rate adjusting device mounted in the ventilation hole. The ventilation hole and the ventilation rate adjusting device constitute at least a part of a ventilation channel which is isolated from the inner cavity. The ventilation channel fluidly connects the acoustic meatus to the external when the user wears the in-ear wireless earphone. The ventilation rate of the ventilation channel can be electrically adjusted to adjust audio characteristics.

15 Claims, 22 Drawing Sheets

(56) References Cited

U.S. PATENT DOCUMENTS

| | | | | |
|---|---|---|---|---|
| 2014/0169603 | A1 | 6/2014 | Sacha et al. | |
| 2018/0221209 | A1* | 8/2018 | Ogut | H04R 1/1083 |
| 2019/0208301 | A1 | 7/2019 | Monti et al. | |
| 2020/0107110 | A1* | 4/2020 | Ji | G01V 3/081 |
| 2020/0137475 | A1 | 4/2020 | Rugolo | |
| 2020/0196074 | A1 | 6/2020 | Tiefenau | |
| 2020/0221207 | A1 | 7/2020 | Rugolo | |
| 2020/0260197 | A1 | 8/2020 | Thomsen et al. | |
| 2020/0288248 | A1* | 9/2020 | Liang | H04R 9/042 |
| 2021/0092536 | A1 | 3/2021 | Roeck et al. | |
| 2022/0095058 | A1 | 3/2022 | Thomsen et al. | |
| 2022/0132258 | A1 | 4/2022 | Tiefenau | |
| 2022/0217462 | A1* | 7/2022 | Panecki | H04R 1/22 |
| 2022/0217463 | A1* | 7/2022 | Panecki | H04R 1/1041 |
| 2022/0417635 | A1 | 12/2022 | Pakarinen | |

FOREIGN PATENT DOCUMENTS

| | | | |
|---|---|---|---|
| CN | 103826179 | A | 5/2014 |
| CN | 111328007 | A | 6/2020 |
| CN | 111541980 | A | 8/2020 |
| CN | 211880607 | U | 11/2020 |
| CN | 112997510 | A | 6/2021 |
| CN | 114731464 | A | 7/2022 |
| DE | 19942707 | A | 3/2001 |
| EP | 2835987 | B1 | 12/2013 |
| EP | 3668118 | A1 | 6/2020 |
| EP | 3694227 | A1 | 8/2020 |
| JP | 2012249187 | A | 12/2012 |
| JP | 2020108141 | A | 7/2020 |
| JP | 2020108141 | A1 | 7/2020 |
| JP | 2022504939 | A | 1/2022 |
| JP | 2023501089 | A | 1/2023 |
| KR | 1020210069728 | A | 6/2021 |
| WO | 2012149970 | A1 | 11/2012 |
| WO | 2020092088 | A1 | 5/2020 |
| WO | 2021098949 | A1 | 5/2021 |

OTHER PUBLICATIONS

Communication from Japan Patent Office with Search Report of JP Patent Application No. 2023-044668, dated Jun. 4, 2024.

Communication from European Patent Office with Search Report of EP Patent Application No. 23162607.8, dated Aug. 21, 2023.

* cited by examiner

IN-EAR WEARABLE DEVICE

This application claims priority to Chinese Patent Application No. 202210286056.2 filed on Mar. 22, 2022, currently pending, which is incorporated herein by reference in its entirety.

TECHNICAL FIELD

The disclosure relates to wearable devices, and particularly to an in-ear wearable device.

BACKGROUND

As the application scenarios of mobile devices such as smart phones are becoming extensive, and people use more and more audio and video services, wireless earphones are rapidly popularized because of the advantages such as portability and no entanglement, and TWS (True Wireless Stereo) Bluetooth earphones have become mainstream products of the wireless earphones due to the advantages such as short delay and good sound quality. However, the TWS Bluetooth earphones at present are most of standard sizes, which will cause discomfort to wearing users' ears after being worn for a long time, thereby limiting the wearing time and the application scenarios. In addition, when an in-ear wireless earphone is worn for a long time, an external acoustic meatus will be closed to generate an ear occlusion effect, such that the pressures inside and outside the ear are unbalanced and reduce the comfort, and moisture and infection may be caused due to the lack of ventilation in the acoustic meatus.

Therefore, there is a need for an in-ear wearable device and an in-ear wireless earphone with improved wearing comfort.

SUMMARY

An objective of the disclosure is to provide an in-ear wearable device capable of improving the wearing comfort. Another objective of the disclosure is to provide an in-ear wearable device capable of being adapted to different use scenarios. Another objective of the disclosure is to provide an in-ear wearable device capable of ventilating an acoustic meatus. Another object of the disclosure is to provide an in-ear wearable device capable of defining different audio effects.

An aspect of the disclosure provides an in-ear wearable device, comprising: a customized housing having a housing wall and an inner cavity surrounded by the housing wall, the customized housing comprising a first portion before being inserted into an acoustic meatus of a user and matching with a shape of the acoustic meatus, and a second portion for being exposed to an external environment when the first portion is inserted into the acoustic meatus; a panel mounted to the customized housing at an open end of the second portion away from the first portion; a ventilation hole at least partially disposed in the customized housing, wherein a section of the ventilation hole disposed in the customized housing is formed in the housing wall; and a ventilation rate adjusting device mounted in the ventilation hole, wherein the ventilation hole and the ventilation rate adjusting device constitute at least a part of a ventilation channel which is isolated from the inner cavity of the customized housing, the ventilation channel is configured to fluidly connect the acoustic meatus of the user to the external environment when the user wears the in-ear wireless earphone, and the ventilation rate adjusting device is configured to electrically adjust a ventilation rate of the ventilation channel to adjust audio characteristics of the in-ear wearable device.

According to some embodiments of the disclosure, the ventilation channel is completely disposed in the customized housing.

According to some embodiments of the disclosure, the ventilation channel comprises a first section disposed in the customized housing and a second section disposed in the panel.

According to some embodiments of the disclosure, the ventilation hole comprises a first orifice for being exposed to the acoustic meatus and a second orifice for being exposed to the external environment when the user wears the in-ear wearable device, and the ventilation rate adjusting device is disposed at the second orifice of the ventilation hole.

According to some embodiments of the disclosure, the ventilation hole comprises a first orifice for being exposed to the acoustic meatus and a second orifice for being exposed to the external environment when the user wears the in-ear wearable device, and the ventilation rate adjusting device is disposed at a middle position of the ventilation hole spaced apart from both the first orifice and the second orifice.

According to some embodiments of the disclosure, the ventilation channel is a straight-through channel or a bent channel.

According to some embodiments of the disclosure, the ventilation rate adjusting device is configured to be electrically operable to switch between a fully open state for fully opening the ventilation channel and a fully closed state for fully closing the ventilation channel.

According to some embodiments of the disclosure, the ventilation rate adjusting device is configured to be electrically operable to be in a state of partially opening the ventilation channel.

According to some embodiments of the disclosure, the ventilation rate adjusting device is further configured to be electrically operable to continuously adjust the ventilation rate of the ventilation channel.

According to some embodiments of the disclosure, the ventilation rate adjusting device comprises a movable portion, a fixed portion and an electric actuator, and the electric actuator is configured to electrically drive the movable portion to move relative to the fixed portion to adjust the ventilation rate of the ventilation channel.

According to some embodiments of the disclosure, the customized housing comprises a window facing the inner cavity, and the electric actuator is electrically connected to a battery of the in-ear wearable device through the window.

According to some embodiments of the disclosure, the customized housing has an integral structure.

According to some embodiments of the disclosure, the ventilation rate adjusting device is disposed to be not exposed from an outer surface of the customized housing.

According to some embodiments of the disclosure, the ventilation rate adjusting device adopts an electromagnetic valve structure and comprises a piston as the movable portion, an outer shell as the fixed portion and an electromagnetic unit as the electric actuator, the outer shell comprises an opening communicated with the ventilation hole, and the ventilation rate adjusting device is configured to adjust the ventilation rate of the ventilation channel by using the electromagnetic unit to drive the piston to move relative to the outer shell.

According to some embodiments of the disclosure, the ventilation rate adjusting device comprises a connecting tube which connects the outer shell and the ventilation hole to isolate the ventilation channel from the inner cavity.

According to some embodiments of the disclosure, the electromagnetic unit comprises an electromagnetic coil, the piston comprises a magnet, and a moving direction of the piston is substantially parallel to an extending direction of the ventilation hole at the ventilation rate adjusting device.

According to some embodiments of the disclosure, the electromagnetic unit comprises an electromagnet, the piston comprises a magnet, and a moving direction of the piston is substantially perpendicular to an extending direction of the ventilation hole at the ventilation rate adjusting device.

According to some embodiments of the disclosure, the ventilation rate adjusting device adopts a butterfly valve structure, and comprises a valve plate as the movable portion, a valve body as the fixed portion and a motor as the electric actuator, the valve body comprises an opening communicated with the ventilation hole, the valve plate is disposed inside the valve body, and the ventilation rate adjusting device is configured to adjust the ventilation rate of the ventilation channel by using the motor to drive the valve plate to rotate in the valve body.

According to some embodiments of the disclosure, the ventilation rate adjusting device further comprises a first toothed engagement portion which is connected with the valve plate in a non-rotatable way and a second toothed engagement portion which is connected with an output shaft of the motor in a non-rotatable way, and the first toothed engagement portion and the second toothed engagement portion are meshed with each other.

According to some embodiments of the disclosure, the first toothed engagement portion is integrally formed with the valve plate.

According to some embodiments of the disclosure, the ventilation rate adjusting device further comprises a valve plate fixing member disposed outside the valve body, and the valve plate comprises an extending portion configured to pass through a wall of the valve body to be fixedly connected to the valve plate fixing member.

According to some embodiments of the disclosure, the extending portion is fixedly connected to the valve plate fixing member by an adhesive.

According to some embodiments of the disclosure, the ventilation rate adjusting device adopts a rotary-cover-with-opening structure and comprises a rotary cover as the movable portion, a base as the fixed portion and a motor as the electric actuator, the rotary cover comprises an opening, the base comprises an opening, and the ventilation rate adjusting device is configured to adjust the ventilation rate of the ventilation channel by using the motor to drive the rotary cover to rotate relative to the base.

According to some embodiments of the disclosure, the ventilation rate adjusting device further comprises a first toothed engagement portion which is connected with the rotary cover in a non-rotatable way and a second toothed engagement portion which is connected with an output shaft of the motor in a non-rotatable way, and the first toothed engagement portion and the second toothed engagement portion are meshed with each other.

According to some embodiments of the disclosure, the first toothed engagement portion is integrally formed with the valve plate.

According to some embodiments of the disclosure, the ventilation rate adjusting device further comprises a rotary cover fixing member disposed at an end of the base away from the rotary cover and a pin, and the pin is configured to pass through the base to fixedly connect the rotary cover and the rotary cover fixing member.

According to some embodiments of the disclosure, the pin is integrally formed with the rotary cover fixing member, the pin comprises external threads, and the rotary cover comprises an internal threaded hole engaged with the external threads of the pin.

According to some embodiments of the disclosure, a rotation axis of the rotary cover is substantially parallel to an extending direction of the ventilation hole at the ventilation rate adjusting device.

According to some embodiments of the disclosure, the ventilation rate adjusting device adopts an one-way valve structure and comprises a valve core as the movable portion, a valve seat as the fixed portion and a motor as the electric actuator, the valve seat comprises a fluid channel communicated with the ventilation hole, and the ventilation rate adjusting device is configured to adjust the ventilation rate of the ventilation channel by using the motor to drive the valve core to move relative to the valve seat.

According to some embodiments of the disclosure, the ventilation rate adjusting device further comprises a spring configured to apply an elastic force to the valve core, and the ventilation rate adjusting device is configured to drive the valve core to move relative to the valve seat against the elastic force of the spring by using the motor.

According to some embodiments of the disclosure, a moving direction of the valve core is substantially parallel to an extending direction of the ventilation hole at the ventilation rate adjusting device.

According to some embodiments of the disclosure, the ventilation rate adjusting device further comprises a first toothed engagement portion engaged with the valve core and a second toothed engagement portion which is connected with an output shaft of the motor in a non-rotatable way, and the first toothed engagement portion and the second toothed engagement portion are meshed with each other.

According to some embodiments of the disclosure, the ventilation rate adjusting device adopts an aperture structure, and comprises a plurality of blades as the movable portion, a fixed seat as the fixed portion, a rotary ring and a motor as the electric actuator, the fixed seat comprises a fluid channel communicated with the ventilation hole, and the ventilation rate adjusting device is configured to adjust the ventilation rate of the ventilation channel by using the motor to drive and rotate the rotary ring so as to move the blades relative to the fixed seat.

According to some embodiments of the disclosure, the blade comprises a first protrusion protruding from one surface and a second protrusion protruding from the other surface, the rotary ring comprises a driving groove for matching with the first protrusion, and the fixed seat comprises a sliding groove for matching with the second protrusion.

According to some embodiments of the disclosure, the ventilation rate adjusting device further comprises a first toothed engagement portion which is connected with the rotary ring in a non-rotatable way and a second toothed engagement portion which is connected with an output shaft of the motor in a non-rotatable way, and the first toothed engagement portion and the second toothed engagement portion are meshed with each other.

According to some embodiments of the disclosure, the first toothed engagement portion is integrally formed with the rotary ring.

According to some embodiments of the disclosure, the ventilation rate adjusting device adopts a plug structure, and comprises a plug member as the movable portion, a plug seat as the fixed portion and a motor as the electric actuator, the plug seat comprises a fluid channel communicated with the ventilation hole, and the ventilation rate adjusting device is configured to adjust the ventilation rate of the ventilation channel by using the motor to drive the plug member to move relative to the plug seat.

According to some embodiments of the disclosure, the plug member is configured to be driven by the motor so as to be inserted into and pulled out of the plug seat.

According to some embodiments of the disclosure, the plug member comprises a fluid channel, and the fluid channel of the plug member is in fluid communication with the fluid channel of the plug seat when the plug member is inserted into the plug seat.

According to some embodiments of the disclosure, the plug seat is integrally formed with the customized housing.

According to some embodiments of the disclosure, the ventilation rate adjusting device further comprises a first engagement portion fixedly connected to the plug member and a second engagement portion which is connected with an output shaft of the motor in a non-rotatable way, and the first engagement portion and the second engagement portion are threadedly engaged with each other.

According to some embodiments of the disclosure, the plug member is which is connected with an output shaft of the motor in a non-rotatable way, so that the motor can drive the plug member to rotate to be inserted into or pulled out of the plug seat.

According to some embodiments of the disclosure, the ventilation rate adjusting device further comprises a first toothed engagement portion fixedly connected to the plug member and a second toothed engagement portion which is connected with an output shaft of the motor in a non-rotatable way, and the first toothed engagement portion and the second toothed engagement portion are meshed with each other.

According to some embodiments of the disclosure, the first toothed engagement portion is integrally formed with the plug member.

According to some embodiments of the disclosure, the in-ear wearable device is an in-ear wireless earphone.

According to the embodiments of the disclosure, the in-ear wearable device comprises the ventilation hole in which the ventilation rate adjusting device is disposed. By electrically opening or closing the ventilation hole with the ventilation rate adjusting device, it is possible to switch between different use modes to overcome the ear occlusion effect, improve the wearing comfort for the user, and adapt to different use scenarios.

DETAILED DESCRIPTION OF THE EMBODIMENTS

Figure 1:
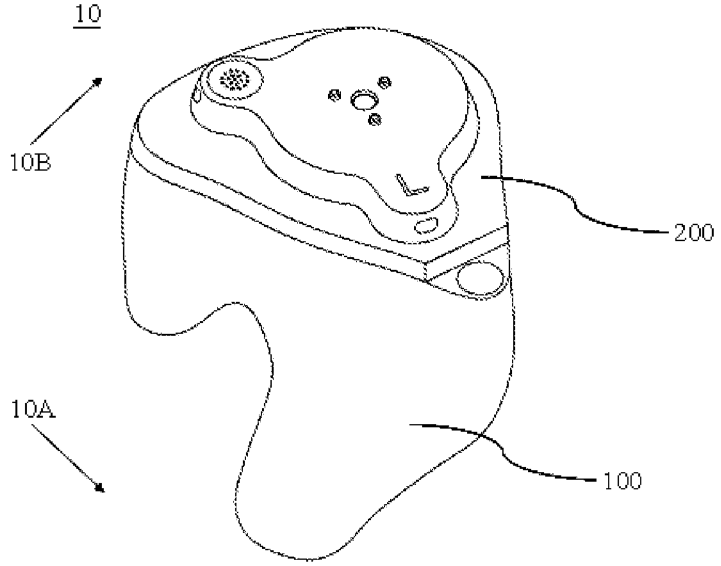
FIG. 1 shows a perspective view of an in-ear wireless earphone according to some embodiments of the disclosure.

Hereinafter, the embodiments of the disclosure are described with reference to the drawings. The following detailed description and drawings are used to illustrate the principles of the disclosure. The disclosure is not limited to the described preferred embodiments, and its scope is defined by the claims. The disclosure will now be described in detail with reference to the exemplary embodiments, some of which are illustrated in the drawings. The following description is made with reference to the drawings, wherein like reference numerals in different drawings represent the same or similar elements unless otherwise indicated. The solutions described in the following exemplary embodiments do not represent all the solutions of the disclosure. Rather, these solutions are merely examples of systems and methods of various aspects of the disclosure involved in the appended claims.

The disclosure provides an in-ear wearable device, which can provide a user with various functions, such as audio reproduction, sound reception, health monitoring, etc., by being inserted into the user's ear, especially an acoustic meatus of the user. The structure and the principle of the in-ear wearable device will be described in detail below by taking an in-ear wireless earphone as an example. But it shall be appreciated that the in-ear wearable device according to the disclosure is not limited to the in-ear wireless earphone. For example, in addition to the audio reproduction function, the in-ear wearable device may be additionally or alternatively implemented as having functions such as sound reception, temperature detection, blood pressure detection, heart rate detection, blood glucose detection, blood oxygen detection, etc. Furthermore, in some embodiments, the in-ear wearable device may not be implemented as an in-ear wireless earphone, that is, it only has other functions rather than the audio reproduction function.

FIG. 1 shows a perspective view of an in-ear wireless earphone 10 according to some embodiments of the disclosure. Only one earphone (for example, a left earphone) is shown in FIG. 1, but those skilled in the art shall appreciate that a pair of earphones is usually composed of a left earphone and a right earphone with substantially symmetrical structures. Thus, for simplicity, only one earphone is shown in the drawing, and the following description is given only for one earphone. The in-ear wireless earphone 10 includes a first side 10A and a second side 10B. The first side 10A of the in-ear wireless earphone 10 represents a side in the acoustic meatus of the user when the user wears the in-ear wireless earphone 10, and the second side 10B of the in-ear wireless earphone 10 represents a side exposed to an external environment when the user wears the in-ear wireless earphone 10. As shown in FIG. 1, the first side 10A of the in-ear wireless earphone 10 is located at its lower portion, and the second side 10B is located at its upper portion.

Figure 2:
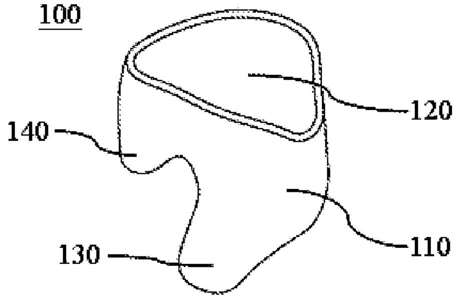
FIG. 2 shows a perspective view of a customized housing of an in-ear wireless earphone according to some embodiments of the disclosure.

Referring to FIG. 1, the in-ear wireless earphone 10 according to some embodiments of the disclosure includes a customized housing 100 and a panel 200. FIG. 2 shows a perspective view of a customized housing of an in-ear wireless earphone according to some embodiments of the disclosure. Herein, the term 'customized' means that the housings are designed and manufactured individually, rather than uniformly, for different users' ears. The customized housing 100 for example may be manufactured using a manufacturing device based on an ear mold taken from a user's ear. The customized housing 100 may be manufactured by 3D printing or any other manufacturing method. The size of the customized housing 100 may be the same as that of the taken ear mold, or slightly smaller than that of the taken ear mold to improve the wearing comfort for some sensitive users.

In a case where the user wears a standard earphone, the size of the standard earphone is fixed and shall be as small as possible to adapt to the sizes of most users' ears (e.g., auricular concha cavities). But in order to ensure the stable wearing without falling off, it is necessary to provide some protrusions so that the earphone can be firmly stuck on the ear. In this case, when the standard earphone is worn, some parts of the acoustic meatuses or auricles of most users will be compressed, thereby resulting in discomfort caused by long-term wearing. For example, many users will feel uncomfortable with their ears after wearing the standard earphone for 30 minutes or even less. However, in the disclosure, since the customized housing 100 of the in-ear wireless earphone 10 is customized for the user and substantially does not compress the user's ear, the in-ear wireless earphone 10 of the disclosure improves the wearing comfort compared with the standard earphone, so that the user can wear the earphone for a longer time such as several hours or more. Further, since the user can wear the earphone for a longer time, it is more possible for the user to apply the earphone in various scenarios. For example, in addition to the conventional audio and video services, the earphone can also be used to make voice or video calls, play games, and carry out various virtual reality activities.

In an exemplary embodiment, the customized housing 100 has an integral structure or is integrally formed, i.e., formed at one time based on the ear mold of the user. In other embodiments, the customized housing 100 may also be composed of a plurality of parts. For example, the customized housing 100 may include an inner core portion that is the same for all or most users and may be assembled with the panel 200, and a customized adaption portion formed based on the ear mold of the user. In a case where the customized housing 100 includes the inner core portion and the customized adaption portion, the production efficiency can be improved since components other than the customized adaption portion are the same for most users.

According to some embodiments of the disclosure, the customized housing 100 includes a first portion for being inserted into an acoustic meatus of a user and matching with the shape of the acoustic meatus, and a second portion for being exposed to the external environment when the first portion is inserted into the acoustic meatus. By 'customization', when the user wears the in-ear wireless earphone 10, the customized housing 100 at least partially fits the acoustic meatus of the user. Thus, the first portion of the customized housing 100 serves as a portion that fits the acoustic meatus of the user, i.e., a portion isolated from the external environment, so as to provide a sealed listening environment in the acoustic meatus when the user wears the in-ear wireless earphone 10. In addition, the second portion of the customized housing 100 serves as a portion exposed to the external environment when the user wears the in-ear wireless earphone 10. In some embodiments, the second portion of the customized housing 100 includes an open end located on a side of the second portion away from the first portion. In some embodiments, the panel 200 is mounted to the customized housing 100 at the open end of the second portion of the customized housing 100. For example, other components of the in-ear wireless earphone 10 may be arranged in the customized housing 100 through the open end, and then the panel 200 may be mounted to the open end.

According to some embodiments of the disclosure, the customized housing 100 includes a housing wall 110 and an inner cavity 120 surrounded by the housing wall 110. In some embodiments, the in-ear wireless earphone 10 may further include components such as a mainboard, a manipulation device, a charging device, a battery, an antenna device, a magnet, a sound pickup device, a speaker assembly and a wireless communication module. The components may be assembled together by means of bolts, welding, gluing, clamping, or the like. These components may be disposed in a space enclosed by the customized housing 100 and the panel 200. Specifically, these components may be mainly located in the inner cavity 120 of the customized housing 100, and the panel 200 may be used to enclose the inner cavity 120. The panel 200 may be a flat cover plate or any rugged or uneven cover plate as long as other components can work normally. In an exemplary embodiment, the panel 200 is mounted to the customized housing 100 on the second side 10B of the in-ear wireless earphone 10.

In some embodiments, as shown in FIG. 2, the customized housing 100 may include a first protruding portion 130 and a second protruding portion 140. When the user wears the in-ear wireless earphone 10, the first protruding portion 130 may be located in an auricular concha cavity of the user or both the auricular concha cavity and the external acoustic meatus of the user, and the second protruding portion 140 may be located in a cymba conchae of the user. The first protruding portion 130 may include an opening, and the speaker assembly is located in the first protruding portion 130 close to the opening. Thus, the sound output by a sound output device of the speaker assembly enters the acoustic meatus of the user through the opening.

Figure 3:
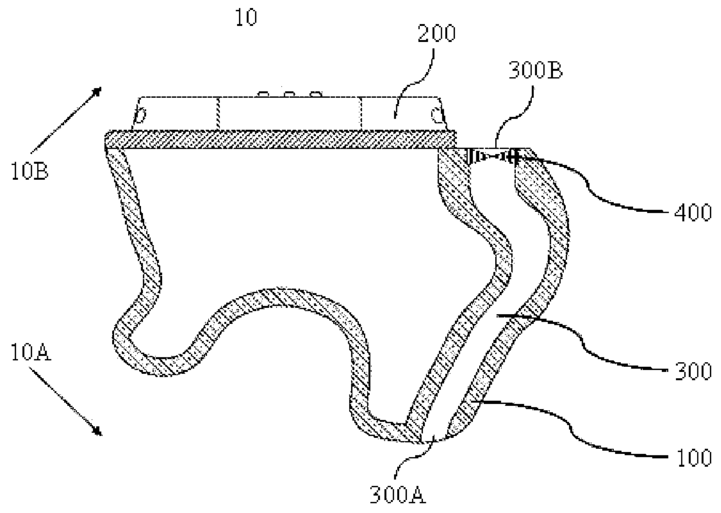
FIG. 3 shows a cross-sectional view of an in-ear wireless earphone according to some embodiments of the disclosure.

FIG. 3 shows a cross-sectional view of an in-ear wireless earphone according to some embodiments of the disclosure. According to some embodiments of the disclosure, the in-ear wireless earphone includes a ventilation hole 300 and a ventilation rate adjusting device 400. The ventilation hole 300 is at least partially disposed in the customized housing 100, i.e., at least partially formed by the customized housing 100. In some embodiments, a section of the ventilation hole 300 disposed in the customized housing 100 is formed in the housing wall 110. For example, the section of the ventilation hole 300 disposed in the customized housing 100 may be formed along with the manufacturing of the customized housing 100, or may be additionally formed in the housing wall 110 after the customized housing 100 is manufactured. According to some embodiments of the disclosure, as shown in FIG. 3, the ventilation hole 300 is completely disposed in the customized housing 100. In an exemplary embodiment, the ventilation hole 300 is completely disposed in the housing wall 110 of the customized housing 100. The ventilation hole 300 includes a first orifice 300A for being exposed to the acoustic meatus of the user and a second orifice 300B for being exposed to the external environment when the user wears the in-ear wireless earphone 10. Thus, the first orifice 300A is located on the first side 10A of the in-ear wireless earphone 10, and the second orifice 300B is located on the second side 10B of the in-ear wireless earphone 10. In some embodiments, the ventilation hole 300 is a straight-through ventilation hole. In some embodiments, ventilation hole 300 is a bent ventilation hole. Compared with the straight-through ventilation hole, the bent ventilation hole can provide a longer ventilation hole length in a relatively small volume, thereby being more suitable for the in-ear wireless earphone 10 or the customized housing 100 with a small volume.

According to some embodiments of the disclosure, the ventilation rate adjusting device 400 is mounted in the ventilation hole 300. The ventilation hole 300 and the ventilation rate adjusting device 400 constitute at least a part of a ventilation channel which is isolated from the inner cavity 120 of the customized housing 100. The term 'isolated' means that when the user wears the in-ear wireless earphone 10 (i.e., when the first portion of the customized housing 100 is inserted into the acoustic meatus of the user), the ventilation channel is not in fluid communication with the inner cavity 120 of the customized housing 100. The ventilation channel is configured to fluidly connect the acoustic meatus of the user to the external environment when the user wears the in-ear wireless earphone 10. Thus, the ventilation channel is configured to fluidly connect the first side 10A and the second side 10B of the in-ear wireless earphone. By isolating the ventilation channel from the inner cavity 120 of the customized housing 100, the influence of a ventilation airflow on the internal components and the sound quality of the in-ear wireless earphone can be avoided or reduced in a ventilation process of the ventilation channel, and the applicability and stability of the in-ear wireless earphone in different modes can be improved.

In some embodiments, the ventilation rate adjusting device 400 is disposed at the second orifice 300B of the ventilation hole 300, i.e., at an end of the ventilation hole 300 on the second side 10B. In some embodiments, the ventilation rate adjusting device 400 is disposed in the ventilation hole 300 at a position spaced apart from both the first orifice 300A and the second orifice 300B, i.e., at a middle position of the ventilation hole 300.

According to some embodiments of the disclosure, the ventilation channel is at least partially disposed in the customized housing 100. In some embodiments, the ventilation channel is completely disposed in the customized housing 100. In some embodiments, the ventilation channel is a straight-through channel. In some embodiments, the ventilation channel is a bent channel. The bent channel is suitable to be arranged in a smaller housing and in-ear wireless earphone to achieve a ventilation channel of the same length or longer than the pass-through channel.

According to some embodiments of the disclosure, the ventilation rate adjusting device 400 is configured to be electrically operated to adjust a ventilation rate of the ventilation channel. Specifically, the ventilation rate adjusting device 400 may be electrically operated to open and close the ventilation hole 300, thereby opening and closing the ventilation channel. Therefore, the ventilation channel may perform a ventilation when being opened by the ventilation rate adjusting device 400, and may provide a better listening effect when being closed by the ventilation rate adjusting device 400.

When the user wears the in-ear wireless earphone with the customized housing, the acoustic meatus is sealed by the customized housing in a case where the ventilation hole is closed, so that the user can have, such as, a better music listening effect. However, in a case where the ventilation hole is closed, the acoustic meatus is sealed by the customized housing, resulting in different air pressures inside and outside the acoustic meatus due to the ear occlusion effect, which causes uncomfortable long-term wearing or unnatural listening for the user. By opening or closing the ventilation hole 300 through the ventilation rate adjusting device 400, it is possible to switch between different use modes to overcome the ear occlusion effect, improve the wearing comfort for the user, and adapt to different use scenarios.

According to some embodiments of the disclosure, the ventilation rate adjusting device 400 may be electrically operated to be switched between a fully open state for fully opening (100%) the ventilation channel and a fully closed state for fully closing (0%) the ventilation channel. In the fully open state, the ventilation channel is in a maximum open state, so that a maximum ventilation rate can be achieved. In the fully closed state, the ventilation channel is in the fully closed state, so that no ventilation can be achieved.

In some embodiments, in addition to the fully open state and the fully closed state described above, the ventilation rate adjusting device 400 may be electrically operated in one or more partially open states for partially opening the ventilation channel. Thus, the ventilation rate adjusting device 400 may have multiple levels of ventilation rates. For example, the ventilation rate adjusting device 400 may be electrically operated to be in a 25% open state, a 50% open state, a 75% open state, and the like.

In some embodiments, the ventilation rate adjusting device 400 may also be electrically operated to continuously adjust a ventilation rate of the ventilation channel. Therefore, the ventilation rate adjusting device 400 can be in a stepless adjustment.

In some embodiments, the ventilation rate adjusting device 400 is configured to adjust the ventilation rate of the ventilation channel so as to adjust audio characteristics of the in-ear wireless earphone 10. Thus, the ventilation rate adjusting device 400 can adjust the ventilation rate of the ventilation channel, i.e., an opening degree of the ventilation hole. When the ventilation channel of the in-ear wireless earphone 10 is fully closed, the in-ear wireless earphone 10 can have better noise reduction effect and audio listening experience. When the ventilation rate adjusting device 400 is electrically operated to open the ventilation channel of the in-ear wireless earphone 10, the ventilation channel can achieve a ventilation, so that the user can receive the sound of the external environment more clearly, which avoids the sound occlusion effect, and improve the wearing comfort. In addition, when the ventilation rate adjusting device 400 is electrically operated to make the ventilation channel have different ventilation rates, the in-ear wireless earphone 10 will have different audio characteristics, so that the user can conveniently adjust his/her listening experience to meet different requirements.

According to some embodiments of the disclosure, the ventilation rate adjusting device 400 may be controlled in a wired or wireless manner to electrically adjust the ventilation rate of the ventilation channel. In some embodiments, the ventilation rate adjusting device 400 may be communicatively connected to a wired or wireless terminal device such as a computer, a mobile phone, a tablet computer, an audio reproducing device, a video processing device, a game console, a navigation device and the like, and receive a control signal from the wired or wireless terminal device. According to the corresponding control signal, the ventilation rate adjusting device 400 can electrically adjust the ventilation rate of the ventilation channel. For example, the user may send an instruction to adjust the ventilation rate of the ventilation channel through an application software (APP) on a mobile phone, so that the ventilation rate adjusting device 400 can adjust the ventilation rate of the ventilation channel through the electric operation according to the instruction.

In some embodiments, the mounting position of the ventilation rate adjusting device 400 may be set at the first orifice 300A or the second orifice 300B of the ventilation hole 300. In some embodiments, the mounting position of the ventilation rate adjusting device 400 is set at a position in the ventilation hole 300 spaced apart from both the first orifice 300A and the second orifice 300B, i.e., at a middle position of the ventilation hole 300. By mounting the ventilation rate adjusting device 400 at different positions in the ventilation hole, different in-ear wireless earphones 10 can have different audio cavities, so that different audio effects can be defined to meet personalized requirements.

According to some embodiments of the disclosure, the ventilation rate adjusting device 400 is disposed so as not to be exposed from an outer surface of the customized housing 100. Thus, except for the first orifice 300A and the second orifice 300B of the ventilation hole 300, the ventilation rate adjusting device 400 is wrapped by the customized housing 100 and cannot be observed or touched from the outside. By preventing the ventilation rate adjusting device 400 from being exposed from the outer surface of the customized housing 100, the components of the ventilation rate adjusting device 400 will not be in contact with the user's ear during the electric adjustment, which improves the user's experience and the accuracy of the adjustment of the ventilation rate. In addition, by wrapping the ventilation rate adjusting device 400 with the customized housing 100, it is possible to avoid or reduce the invasion of external foreign matters or contaminants into the ventilation rate adjusting device 400, which improves the stabilities of the ventilation rate adjusting device 400 and the in-ear wireless earphone 10.

According to some embodiments of the disclosure, the ventilation rate adjusting device 400 includes a movable portion, a fixed portion and an electric actuator, wherein the electric actuator may drive the movable portion to move relative to the fixed portion to adjust the ventilation rate of the ventilation channel. Hereinafter, a ventilation rate adjusting device according to some embodiments of the disclosure will be described in detail with reference to the drawings.

Electromagnetic Valve Structure

Figure 4A:
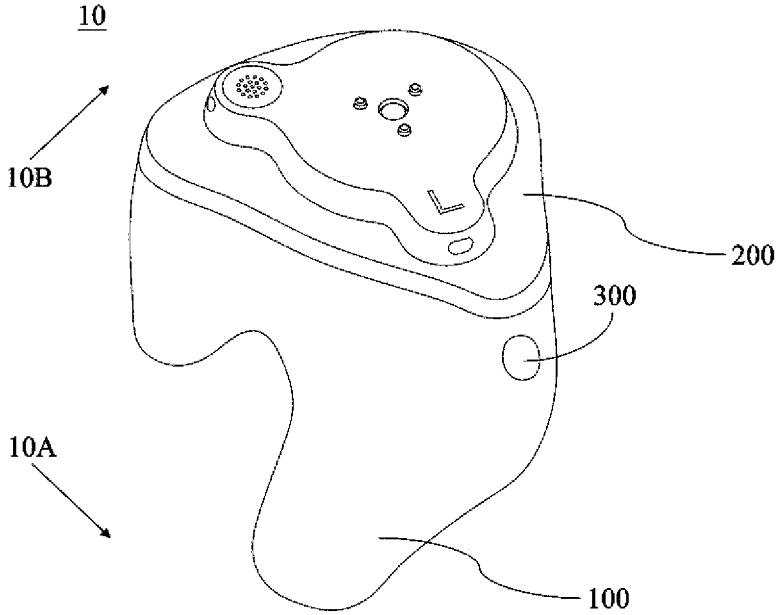
FIG. 4A shows a perspective view of an in-ear wireless earphone according to some embodiments of the disclosure.
Figure 4B:
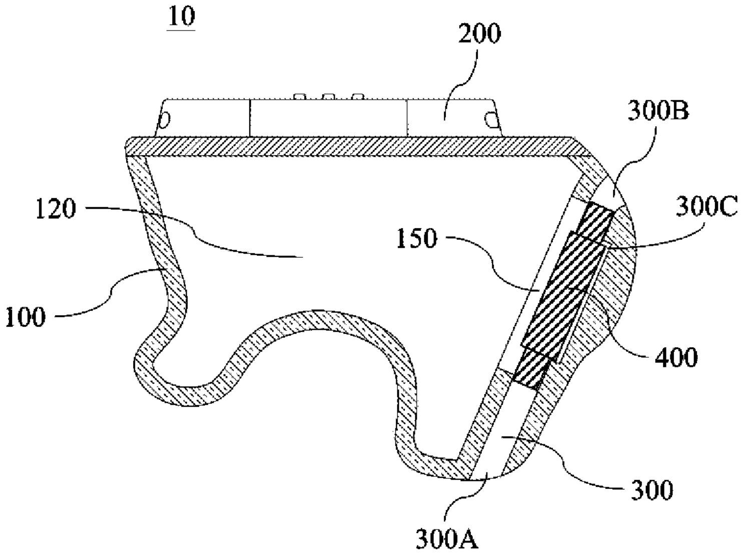
FIG. 4B shows a cross-sectional view of an in-ear wireless earphone according to some embodiments of the disclosure.
Figure 4C:
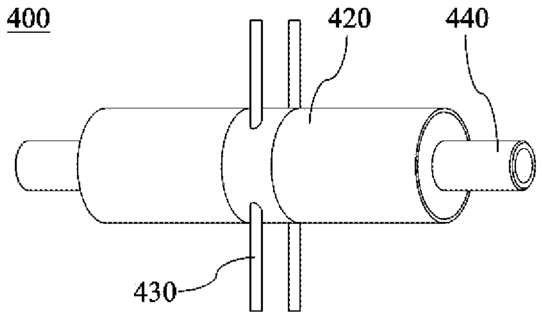
FIG. 4C shows a schematic view of a ventilation rate adjusting device of an in-ear wireless earphone according to some embodiments of the disclosure.
Figure 4D:
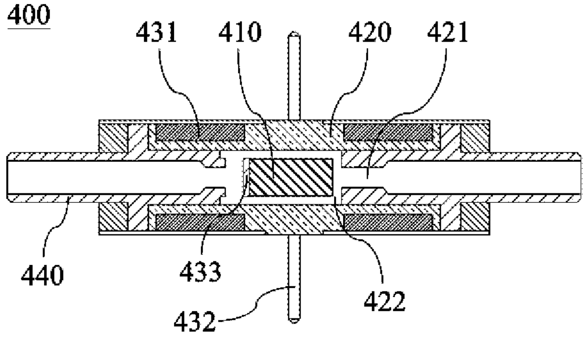
FIG. 4D shows a cross-sectional view of a ventilation rate adjusting device in an open state according to some embodiments of the disclosure.
Figure 4E:
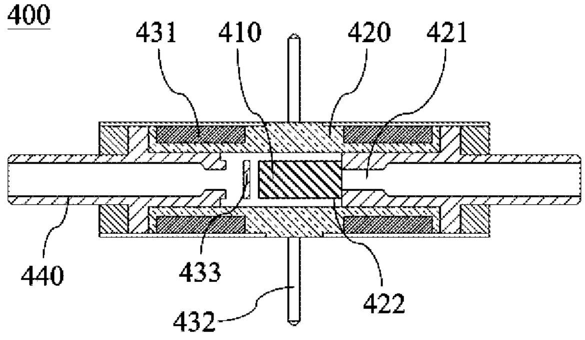
FIG. 4E shows a cross-sectional view of a ventilation rate adjusting device in a closed state according to some embodiments of the disclosure.

According to some embodiments of the disclosure, the ventilation rate adjusting device may adopt an electromagnetic valve structure. FIG. 4A shows a perspective view of an in-ear wireless earphone according to some embodiments of the disclosure. FIG. 4B shows a cross-sectional view of an in-ear wireless earphone according to some embodiments of the disclosure. FIG. 4C shows a schematic view of a ventilation rate adjusting device of an in-ear wireless earphone according to some embodiments of the disclosure. FIG. 4D shows a cross-sectional view of a ventilation rate adjusting device in an open state according to some embodiments of the disclosure. FIG. 4E shows a cross-sectional view of a ventilation rate adjusting device in a closed state according to some embodiments of the disclosure.

As shown in FIG. 4A, the in-ear wireless earphone 10 includes a customized housing 100, a panel 200 and a ventilation hole 300. As shown in FIG. 4B, the ventilation hole 300 of the in-ear wireless earphone 10 is disposed in the customized housing 100 and includes a mounting position 300C for mounting the ventilation rate adjusting device 400. In an exemplary embodiment, as shown in FIG. 4B, the mounting position 300C is set in the ventilation hole 300 at a position spaced apart from both a first orifice 300A and a second orifice 300B, i.e., at a middle position of the ventilation hole 300. In some embodiments, the mounting position 300C may be set at the first orifice 300A or the second orifice 300B of the ventilation hole 300. Please refer to the foregoing descriptions for other components and structures of the in-ear wireless earphone 10, which will not be repeated here.

In some embodiments, an extending direction of the ventilation hole 300 at the mounting position 300C is substantially straight. For example, the ventilation hole 300 is a straight-through ventilation hole, or the ventilation hole 300 has a straight-through section at the mounting position 300C although it is a bent ventilation hole as a whole.

According to some embodiments of the disclosure, as shown in FIGS. 4C to 4E, the ventilation rate adjusting device 400 includes a piston 410 (not shown in FIG. 4C) as the movable portion, an outer shell 420 as the fixed portion, and an electromagnetic unit 430 as the electric actuator. The outer shell 420 includes an opening 421 communicated with the ventilation hole 300. The piston 410 is disposed inside the outer shell 420. The piston 410 is movable relative to the outer shell 420 under the action of the electromagnetic unit 430. In some embodiments, as shown in FIGS. 4D and 4E, the outer shell 420 includes an internal chamber 422 in which the piston 410 is movable. In an exemplary embodiment, a moving direction of the piston 410 is substantially parallel to the extending direction of the ventilation hole 300 at the ventilation rate adjusting device 400. Herein 'the extending direction of the ventilation hole 300 at the ventilation rate adjusting device 400' means an extending direction of the ventilation hole 300 at the mounting position 300C, i.e., a center line of the ventilation hole 300 at the mounting position 300C.

In some embodiments, as shown in FIGS. 4D and 4E, the electromagnetic unit 430 includes an electromagnetic coil 431, and the piston 410 includes a magnet. The electromagnetic coil 431 generates an electromagnetic field when being energized. In some embodiments, the electromagnetic coil 431 is disposed to radially surround the piston 410 as viewed in the moving direction of the piston 410. The electromagnetic coil 431 may be fixed onto or inside the outer shell 420.

In some embodiments, the electromagnetic unit 430 may further include a power line 432 for supplying driving current to the coil 431. In some embodiments, the power line 432 is electrically connected to a battery (not shown) of the in-ear wireless earphone 10. In some embodiments, as shown in FIG. 4B, the customized housing 110 includes a window 150 facing the inner cavity 120, so that the power line 432 of the electromagnetic unit 430 can be electrically connected to the battery of the in-ear wireless earphone 10 through the window 150.

According to some embodiments of the disclosure, the ventilation rate adjusting device 400 may adjust the ventilation rate of the ventilation channel by using the electromagnetic unit 430 to drive the piston 410 to move relative to the outer shell 420. Specifically, when the electromagnetic coil 431 is energized, an electromagnetic field is generated therein, so that the piston 410 is affected by the electromagnetic field to open or close the opening 421 of the outer shell 420, thereby opening or closing the ventilation channel or adjusting the opening degree thereof. When the electromagnetic coil 431 is de-energized, the electromagnetic coil 431 will no longer generate the electromagnetic field, so that the piston 410 returns to the position for closing or opening the opening 421 of the outer shell 420, thereby closing or opening the ventilation channel. In an exemplary embodiment, the piston 410 of the ventilation rate adjusting device 400 is in a state of closing the opening 421 of the outer shell 420 when the electromagnetic coil 431 is not energized.

According to some embodiments of the disclosure, the outer shell 420 includes two openings 421 communicated with the ventilation hole 300 and respectively located on two sides of the piston 410. In some embodiments, as shown in FIGS. 4D and 4E, the electromagnetic unit 430 further includes a stopper 433. When the piston 410 moves relative to the outer shell 420 under the action of the electromagnetic coil 431 to open one opening 421 of the outer shell 420, the stopper 433 may restrict a moving range of the piston 410 to prevent the piston 410 from moving to a position for closing the other opening 421 of the outer shell 420.

In some embodiments, the ventilation rate adjusting device 400 further includes a connecting tube 440 which is in fluid communication with the opening 421 of the outer shell 420. The ventilation rate adjusting device 400 is connected to the ventilation hole 300 of the in-ear wireless earphone 10 through the connecting tube 440. The connecting tube 440 connects the outer shell 420 of the ventilation rate adjusting device 400 to the ventilation hole 300. In some embodiments, the connecting tube 440 is a flexible connecting tube. Through the connecting tube 440, the ventilation rate adjusting device 400 can more advantageously isolate the ventilation channel of the in-ear wireless earphone 10 from the inner cavity 120. However, in the disclosure, the manner for isolating the ventilation channel from the inner cavity is not limited thereto.

In some embodiments, the outer shell 420 is independent from the customized housing 100. However, the disclosure is not limited thereto. In some embodiments, the outer shell 420 may be formed by the customized housing 100, i.e., the outer shell 420 may be integrally formed with the customized housing 100.

The ventilation rate adjusting device 400 with an electromagnetic valve structure is described above with reference to FIGS. 4A to 4E. However, the disclosure is not limited thereto. Hereinafter, other ventilation rate adjusting devices 400 with an electromagnetic valve structure will be described with reference to the drawings.

Figure 5A:
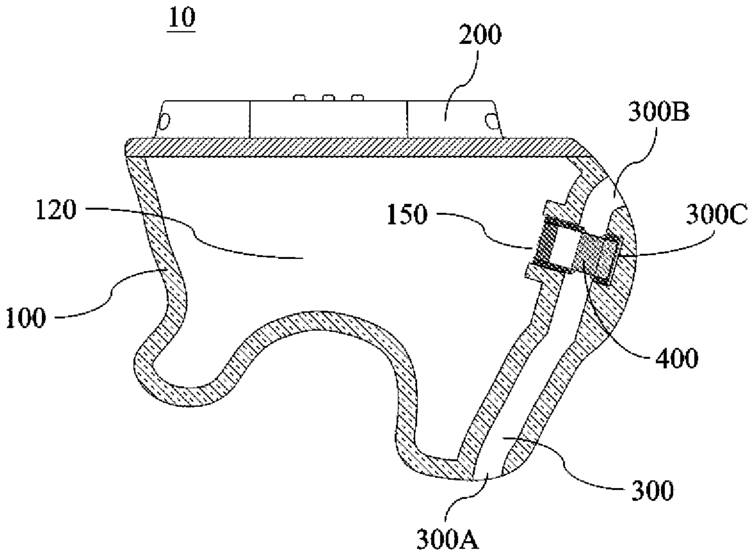
FIG. 5A shows a cross-sectional view of an in-ear wireless earphone according to some embodiments of the disclosure.
Figure 5B:
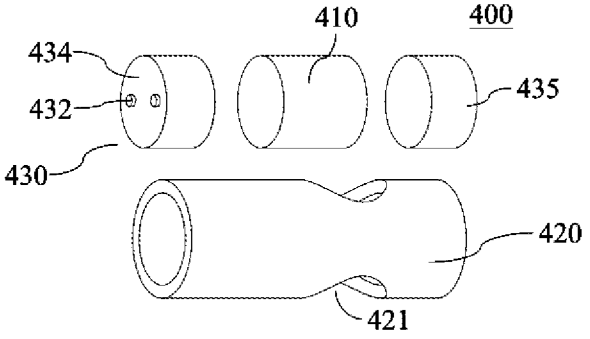
FIG. 5B shows an exploded view of a ventilation rate adjusting device of an in-ear wireless earphone according to some embodiments of the disclosure.
Figure 5C:
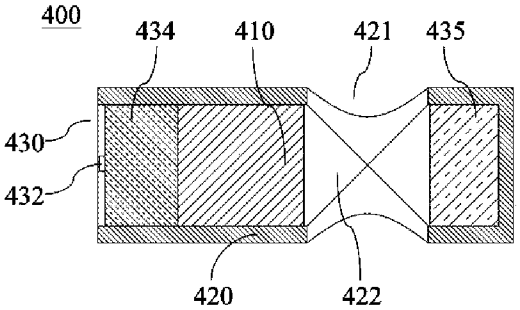
FIG. 5C shows a cross-sectional view of a ventilation rate adjusting device in an open state according to some embodiments of the disclosure.
Figure 5D:
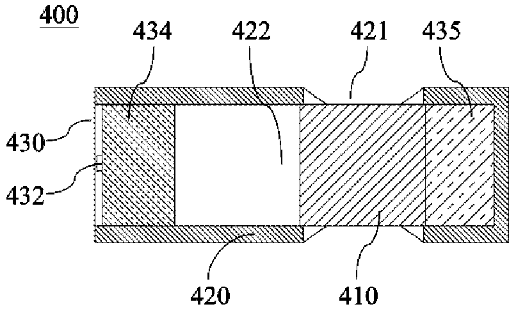
FIG. 5D shows a cross-sectional view of a ventilation rate adjusting device in a closed state according to some embodiments of the disclosure.

FIG. 5A shows a cross-sectional view of an in-ear wireless earphone according to some embodiments of the disclosure. FIG. 5B shows an exploded view of a ventilation rate adjusting device of an in-ear wireless earphone according to some embodiments of the disclosure. FIG. 5C shows a cross-sectional view of a ventilation rate adjusting device in an open state according to some embodiments of the disclosure. FIG. 5D shows a cross-sectional view of a ventilation rate adjusting device in a closed state according to some embodiments of the disclosure.

As shown in FIG. 5A, the in-ear wireless earphone 10 includes a customized housing 100, a panel 200 and a ventilation hole 300. The ventilation hole 300 of the in-ear wireless earphone 10 is disposed in the customized housing 100 and includes a mounting position 300C for mounting the ventilation rate adjusting device 400. In an exemplary embodiment, as shown in FIG. 5A, the mounting position 300C is set in the ventilation hole 300 at a position spaced apart from both a first orifice 300A and a second orifice 300B, i.e., at a middle position of the ventilation hole 300. In some embodiments, the mounting position 300C may be set at the first orifice 300A or the second orifice 300B of the ventilation hole 300. Please refer to the foregoing descriptions for other components and structures of the in-ear wireless earphone 10, which will not be repeated here.

According to some embodiments of the disclosure, as shown in FIGS. 5B to 5D, the ventilation rate adjusting device 400 includes a piston 410 as the movable portion, a outer shell 420 as the fixed portion, and an electromagnetic unit 430 as the electric actuator. The outer shell 420 includes an opening 421 communicated with the ventilation hole 300. The piston 410 is disposed inside the outer shell 420. The piston 410 is movable relative to the outer shell 420 under the action of the electromagnetic unit 430. In some embodiments, as shown in FIGS. 5C and 5D, the outer shell 420 includes an internal chamber 422 in which the piston 410 is movable. In an exemplary embodiment, a moving direction of the piston 410 is intersected with, e.g., substantially perpendicular to, the extending direction of the ventilation hole 300 at the ventilation rate adjusting device 400.

In some embodiments, the electromagnetic unit 430 includes an electromagnet 434, and the piston 410 includes a magnet. The electromagnet 434 is magnetic when being energized. In some embodiments, the electromagnet 434 is disposed to at least partially overlap the piston 410 as viewed in the moving direction of the piston 410. The electromagnet 434 may be fixed onto or inside the outer shell 420.

In some embodiments, the electromagnetic unit 430 may further include a power line 432 for supplying driving current to the electromagnet 434. In some embodiments, the power line 432 is electrically connected to a battery (not shown) of the in-ear wireless earphone 10. In some embodiments, as shown in FIG. 5A, the customized housing 110 includes a window 150 facing the inner cavity 120, so that the power line 432 of the electromagnetic unit 430 can be electrically connected to the battery of the in-ear wireless earphone 10 through the window 150.

According to some embodiments of the disclosure, the ventilation rate adjusting device 400 may adjust the ventilation rate of the ventilation channel by using the electromagnet 434 to drive the piston 410 to move relative to the outer shell 420. Specifically, when the electromagnet 434 is energized, the electromagnet 434 generates magnetism to attract or repel the piston 410 to open or close the opening 421 of the outer shell 420, thereby opening or closing the ventilation channel or adjusting the opening degree thereof. When the electromagnet 434 is de-energized, the magnetism of the electromagnet 434 disappears, so that the piston 410 returns to the position for closing or opening the opening 421 of the outer shell 420, thereby closing or opening the ventilation channel. In an exemplary embodiment, the piston 410 of the ventilation rate adjusting device 400 is in a state of closing the opening 421 of the outer shell 420 when the electromagnet 434 is not energized.

In some embodiments, as shown in FIGS. 5C and 5D, the electromagnetic unit 430 further includes a magnetic restricting portion 435 which may be a magnet or an electromagnet. For example, when the electromagnet 434 is de-energized, the piston 410 may be attracted or repelled by the magnetic restricting portion 435 to return to the position for closing or opening the opening 421 of the outer shell 420. In some embodiments, the magnetic restricting portion 435 may also restrict the moving range of the piston 410, as described above with reference to the stopper 433.

In the embodiments shown in FIGS. 5A to 5D, please refer to the foregoing descriptions for other structures of the ventilation rate adjusting device 400, which will not be repeated here.

Butterfly Valve Structure

Figure 6A:
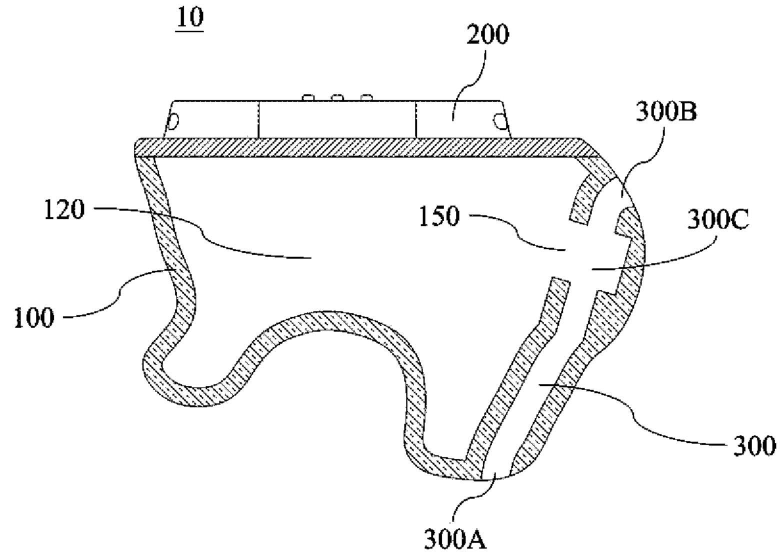
FIG. 6A shows a cross-sectional view of an in-ear wireless earphone according to some embodiments of the disclosure.
Figure 6B:
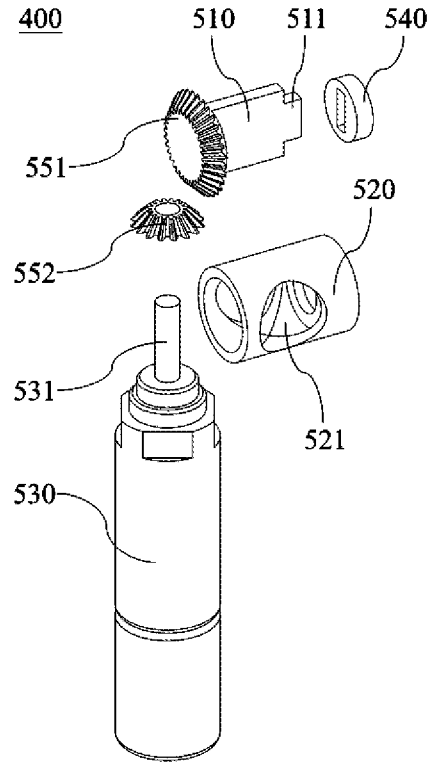
FIG. 6B shows an exploded view of a ventilation rate adjusting device of an in-ear wireless earphone according to some embodiments of the disclosure.
Figure 6C:
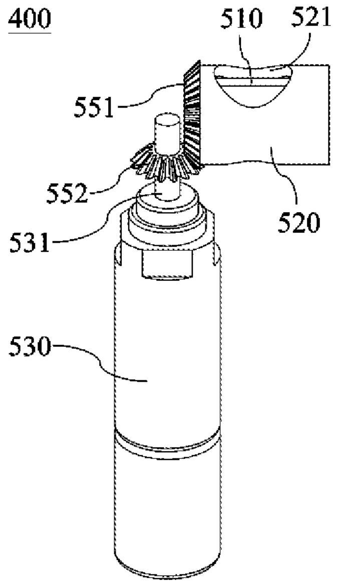
FIG. 6C shows a cross-sectional view of a ventilation rate adjusting device in an open state according to some embodiments of the disclosure.
Figure 6D:
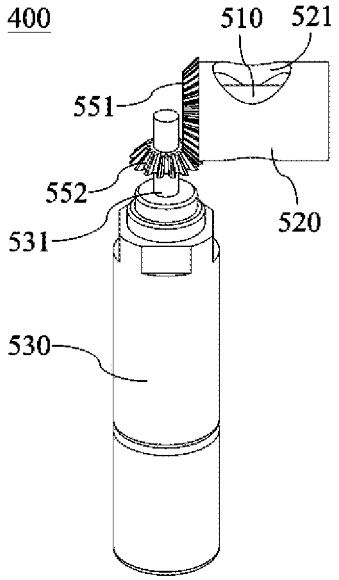
FIG. 6D shows a cross-sectional view of a ventilation rate adjusting device in a closed state according to some embodiments of the disclosure.

According to some embodiments of the disclosure, the ventilation rate adjusting device may adopt a butterfly valve structure. FIG. 6A shows a cross-sectional view of an in-ear wireless earphone according to some embodiments of the disclosure. FIG. 6B shows an exploded view of a ventilation rate adjusting device of an in-ear wireless earphone according to some embodiments of the disclosure. FIG. 6C shows a cross-sectional view of a ventilation rate adjusting device in an open state according to some embodiments of the disclosure. FIG. 6D shows a cross-sectional view of a ventilation rate adjusting device in a closed state according to some embodiments of the disclosure.

As shown in FIG. 6A, the in-ear wireless earphone 10 includes a customized housing 100, a panel 200 and a ventilation hole 300. The ventilation hole 300 of the in-ear wireless earphone 10 is disposed in the customized housing 100, and includes a mounting position 300C for mounting the ventilation rate adjusting device 400 (not shown in FIG. 6A). In an exemplary embodiment, as shown in FIG. 6A, the mounting position 300C is set in the ventilation hole 300 at a position spaced apart from both a first orifice 300A and a second orifice 300B, i.e., at a middle position of the ventilation hole 300. In some embodiments, the mounting position 300C may be set at the second orifice 300B of the ventilation hole 300. In the embodiments shown in FIGS. 6A to 6D, please refer to the foregoing descriptions for other components and structures of the in-ear wireless earphone 10, which will not be repeated here.

According to some embodiments of the disclosure, as shown in FIGS. 6B to 6D, the ventilation regulating device 400 includes a valve plate 510 as the movable portion, a valve body 520 as the fixed portion, and a motor 530 as the electric actuator. The valve body 520 includes an opening 521 communicated with the ventilation hole 300. The valve plate 510 is disposed inside the valve body 520. The valve plate 510 is rotatable relative to the valve body 520, i.e., rotatable within the valve body 520. In some embodiments, the motor 530 is a stepping motor. In an exemplary embodiment, a rotation axis of the valve plate 510 is intersected with, e.g., substantially perpendicular to, the extending direction of the ventilation hole 300 at the ventilation rate adjusting device 400.

In an exemplary embodiment, the ventilation rate adjusting device 400 further includes a valve plate fixing member 540 disposed outside the valve body 520, and the valve plate 510 includes an extending portion 511 which passes through a wall of the valve body 520 to be fixedly connected to the valve plate fixing member 540. In some embodiments, the extending portion 511 of the valve plate 510 is fixed to the valve plate fixing member 540 by an adhesive or the like.

According to some embodiments of the disclosure, the ventilation rate adjusting device 400 further includes a first engagement portion 551 which is connected with the valve plate 510 in a non-rotatable way and a second engagement portion 552 which is connected with an output shaft 531 of the motor 530 in a non-rotatable way. The first engagement portion 551 and the second engagement portion 552 are connected with each other in a transmission way. In an exemplary embodiment, as shown in FIGS. 6B to 6D, the first engagement portion 551 and the second engagement portion 552 are toothed engagement portions, respectively, wherein the first engagement portion 551 and the second engagement portion 552 are meshed with each other. Herein 'toothed engagement portions' mean components for gear transmission, including but not limited to gears, racks, worm wheels, worms, and the like. In an exemplary embodiment, the first engagement portion 551 and the second engagement portion 552 are both straight bevel gears. However, the disclosure is not limited thereto. In other embodiments, the first engagement portion 551 and the second engagement portion 552 may be other types of toothed engagement portions as long as they can be meshed with each other to drive the valve plate 510 to rotate.

In some embodiments, the first engagement portion 551 is integrally formed with the valve plate 510. However, the disclosure is not limited thereto. In some embodiments, the valve plate 510 and the first engagement portion 551 may be formed separately and connected together. For example, the valve plate 510 and the first engagement portion 551 may be connected to each other by an adhesive, threads, or the like.

In some embodiments, as shown in FIG. 6A, the customized housing 110 includes a window 150 facing the inner cavity 120, and a power line (not shown) of the motor 530 may be electrically connected to a battery (not shown) of the in-ear wireless earphone 10 through the window 150. In some embodiments, the motor 530 of the ventilation rate adjusting device 400 may be arranged in the inner cavity 120 of the housing wall 110 through the window 150.

According to some embodiments of the disclosure, the ventilation rate adjusting device 400 may adjust the ventilation rate of the ventilation channel by using the motor 530 to drive the valve plate 510 to rotate. Specifically, when the motor 530 is energized, the output shaft 531 of the motor 530 and the second engagement portion 552 rotate, so as to drive the first engagement portion 551 and the valve plate 510 to rotate relative to the valve body 520, thereby opening or closing the ventilation channel or adjusting the opening degree thereof.

As described above, the valve plate 510 and the valve plate fixing member 540 are connected by an adhesive. However, the disclosure is not limited thereto. Other manners of connecting the valve plate 510 and the valve plate fixing member 540 of the ventilation rate adjusting device will be described below. In some embodiments, the valve plate fixing member 540 includes an internal threaded hole, and the extending portion 511 of the valve plate 510 includes external threads, and the extending portion 511 passes through the wall of the valve body 520 to be threadedly engaged with the internal threaded hole of the valve plate fixing member 540. In some embodiments, the valve plate fixing member of the ventilation rate adjusting device 400 is a bolt pin, the extending portion 511 of the valve plate 510 includes a hole, the extending portion 511 may pass through the wall of the valve body 520, and the valve plate fixing member serving as the bolt pin may be inserted into the hole of the extending portion 511 to fix and restrain the valve plate 510. In some embodiments, the bolt pin may also be fixed into the hole of the extending portion 511 by an adhesive or the like.

In the embodiments shown in FIGS. 6A to 6D, please refer to the foregoing descriptions for other structures of the ventilation rate adjusting device 400, which will not be repeated here.

Rotary-Cover-With-Opening Structure

Figure 7A:
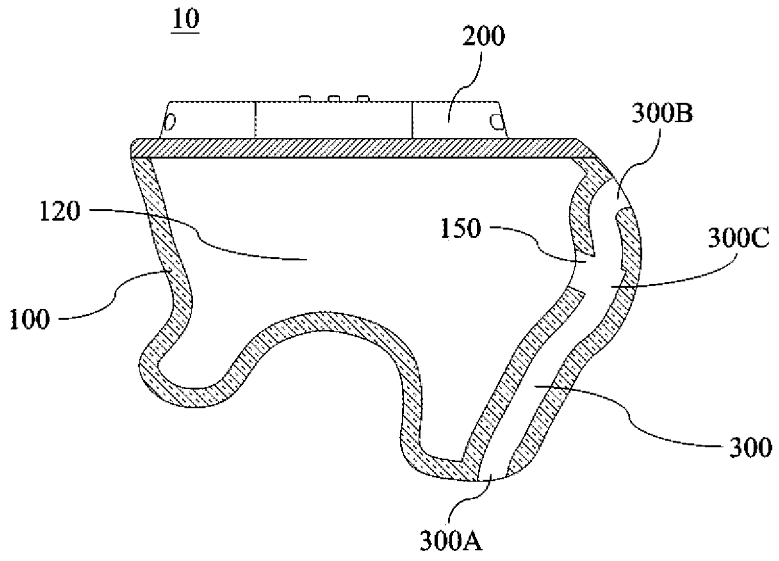
FIG. 7A shows a cross-sectional view of an in-ear wireless earphone according to some embodiments of the disclosure.
Figure 7B:
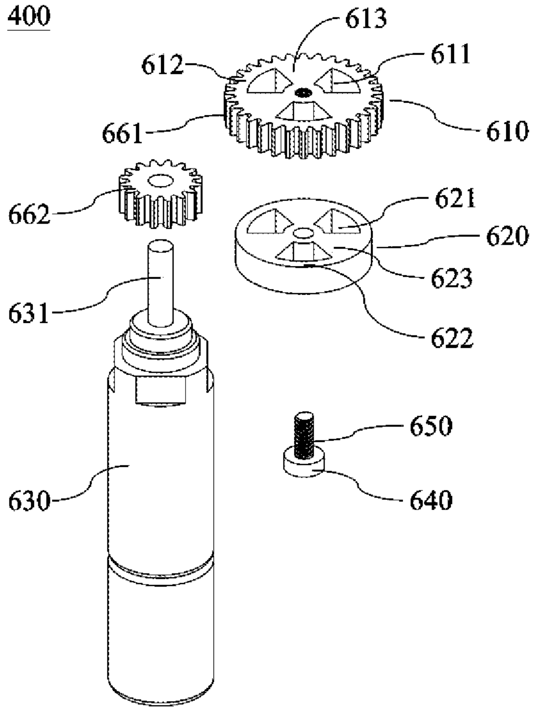
FIG. 7B shows an exploded view of a ventilation rate adjusting device of an in-ear wireless earphone according to some embodiments of the disclosure.
Figure 7C:
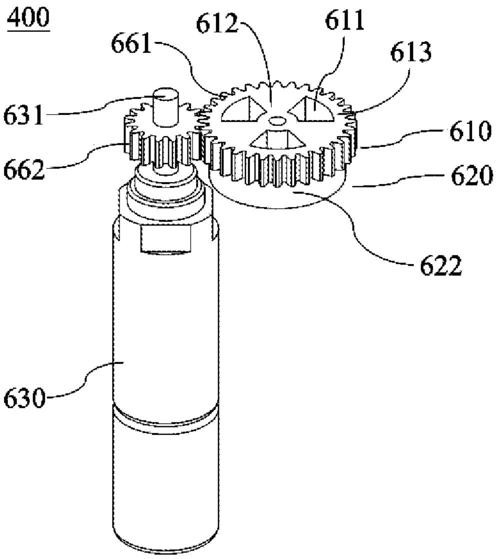
FIG. 7C shows a schematic view of a ventilation rate adjusting device in an open state according to some embodiments of the disclosure.
Figure 7D:
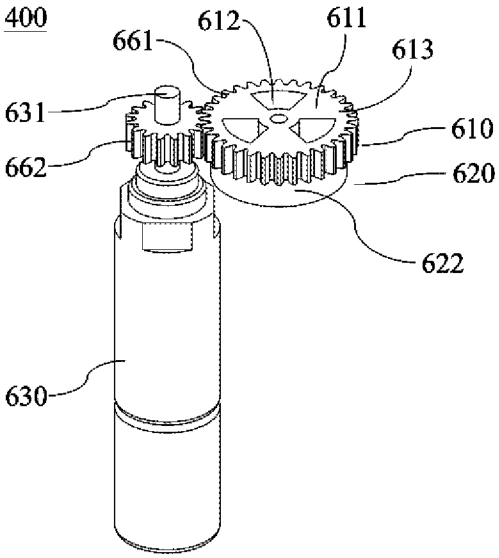
FIG. 7D shows a schematic view of a ventilation rate adjusting device in a closed state according to some embodiments of the disclosure.

According to some embodiments of the disclosure, the ventilation rate adjusting device may adopt a rotary-cover-with-opening structure. FIG. 7A shows a cross-sectional view of an in-ear wireless earphone according to some embodiments of the disclosure. FIG. 7B shows an exploded view of a ventilation rate adjusting device of an in-ear wireless earphone according to some embodiments of the disclosure. FIG. 7C shows a schematic view of a ventilation rate adjusting device in an open state according to some embodiments of the disclosure. FIG. 7D shows a schematic view of a ventilation rate adjusting device in a closed state according to some embodiments of the disclosure.

As shown in FIG. 7A, the in-ear wireless earphone 10 includes a customized housing 100, a panel 200 and a ventilation hole 300. The ventilation hole 300 of the in-ear wireless earphone 10 is disposed in the customized housing 100, and includes a mounting position 300C for mounting a ventilation rate adjusting device 400 (not shown in FIG.

7A). In an exemplary embodiment, as shown in FIG. 7A, the mounting position 300C is set in the ventilation hole 300 at a position spaced apart from both a first orifice 300A and a second orifice 300B, i.e., at a middle position of the ventilation hole 300. In some embodiments, the mounting position 300C may be set at the second orifice 300B of the ventilation hole 300. In the embodiments shown in FIGS. 7A to 7D, please refer to the foregoing descriptions for other components and structures of the in-ear wireless earphone 10, which will not be repeated here.

According to some embodiments of the disclosure, as shown in FIGS. 7B to 7D, the ventilation rate adjusting device 400 includes a rotary cover 610 as the movable portion, a base 620 as the fixed portion, and a motor 630 as the electric actuator. The rotary cover 610 includes an opening 611, and the base 620 includes an opening 621. The rotary cover 610 is rotatable relative to the base 620. By the rotation of the rotary cover 610 relative to the base 620, the opening 611 of the rotary cover 610 and the opening 621 of the base 620 can be communicated with each other and with the ventilation hole 300, thereby achieving the ventilation of the ventilation channel.

In some embodiments, as shown in FIGS. 7B to 7D, the rotary cover 610 is disposed to at least partially overlap the base 620 along a rotation axis of the rotary cover 610. In some embodiments, the rotary cover 610 is disposed closer to the second orifice 300B of the ventilation hole 300 relative the base 620, i.e., the rotary cover 610 is closer to the external environment when the user wears the in-ear wireless earphone 10. However, the disclosure is not limited thereto. In other embodiments, the rotary cover 610 is disposed farther away from the second orifice 300B of the ventilation hole 300 relative to the base 620, i.e., the rotary cover 610 is closer to the acoustic meatus of the user when the user wears the in-ear wireless earphone 10.

In an exemplary embodiment, the rotation axis of the rotary cover 610 is substantially parallel to an extending direction of the ventilation hole 300 at the ventilation rate adjusting device 400. However, the disclosure is not limited thereto. In some embodiments, the rotation axis of the rotary cover 610 is intersected with, e.g., substantially perpendicular to, the extending direction of the ventilation hole 300 at the ventilation rate adjusting device 400.

In some embodiments, as shown in FIGS. 7B to 7D, the rotary cover 610 includes an annular portion 612 and connecting portions 613 arranged in the annular portion 612. The opening 611 of the rotary cover 610 is formed by being surrounded by the annular portion 612 and the connecting portions 613. In addition, the base 620 includes an annular portion 622 and connecting portions 623 arranged in the annular portion 622. The opening 621 of the base 620 is formed by being surrounded by the annular portion 622 and the connecting portions 623. The rotary cover 610 and the base 620 are disposed in the ventilation hole 300 through the annular portions 612 and 622, respectively. It shall be appreciated that the numbers of the openings and the connecting portions of the rotary cover and the base are not particularly limited in the disclosure.

In some embodiments, as shown in FIG. 7B, the ventilation rate adjusting device 400 further includes a rotary cover fixing member 640 and a pin 650 disposed at an end of the base 620 away from the rotary cover 610. The base 620 includes a through-hole. The pin 650 passes through the base 620 to connect the rotary cover 610 and the rotary cover fixing member 640, so as to fix and restrain the rotary cover 610. In an exemplary embodiment, the pin 650 is fixedly connected to the rotary cover fixing member 640. In some embodiments, the pin 650 includes external threads (as shown in FIG. 7B), the rotary cover 610 includes an internal threaded hole (not shown), and the pin 650 passes through the base 620 to be threadedly engaged with the internal threaded hole of the rotary cover 610, thereby connecting the rotary cover 610 and the rotary cover fixing member 640 to each other.

According to some embodiments of the disclosure, the pin 650 and the rotary cover fixing member 640 are connected with each other in a non-rotatable way. In some embodiments, as shown in FIG. 7B, the pin 650 is integrally formed with the rotary cover fixing member 640. In some embodiments, the pin 650 and the rotary cover fixing member 640 may be formed separately and connected together. For example, the pin 650 and the rotary cover fixing member 640 may be connected to each other by an adhesive, threads, or the like.

According to some embodiments of the disclosure, the ventilation rate adjusting device 400 further includes a first engagement portion 661 which is connected with the rotary cover 610 in a non-rotatable way and a second engagement portion 662 which is connected with an output shaft 631 of the motor 630 in a non-rotatable way. The first engagement portion 661 and the second engagement portion 662 are connected with each other in a transmission way. In an exemplary embodiment, as shown in FIGS. 7B to 7D, the first engagement portion 661 and the second engagement portion 662 are toothed engagement portions, respectively, wherein the first engagement portion 661 and the second engagement portion 662 are meshed with each other. In an exemplary embodiment, the first engagement portion 661 and the second engagement portion 662 are both straight spur gears. However, the disclosure is not limited thereto. In other embodiments, the first engagement portion 661 and the second engagement portion 662 may be other types of toothed engagement portions as long as they can be meshed with each other to drive the rotary cover 610 to rotate.

In some embodiments, the first engagement portion 661 is integrally formed with the rotary cover 610. However, the disclosure is not limited thereto. In some embodiments, the rotary cover 610 and the first engagement portion 661 may be formed separately and connected together. For example, the rotary cover 610 and the first engagement portion 661 may be connected to each other by an adhesive, threads, or the like.

In some embodiments, as shown in FIG. 7A, the customized housing 110 includes a window 150 facing the inner cavity 120, and a power line (not shown) of the motor 630 may be electrically connected to a battery (not shown) of the in-ear wireless earphone 10 through the window 150. In some embodiments, the motor 630 of the ventilation rate adjusting device 400 may be arranged in the inner cavity 120 of the housing wall 110 through the window 150.

According to some embodiments of the disclosure, the ventilation rate adjusting device 400 may adjust the ventilation rate of the ventilation channel by using the motor 630 to drive the rotary cover 610 to rotate relative to the base 620. Specifically, when the motor 630 is energized, the output shaft 631 of the motor 630 and the second engagement portion 662 rotate, so as to drive the first engagement portion 661 and the rotary cover 610 to rotate relative to the base 620, thereby opening or closing the ventilation channel or adjusting the opening degree thereof.

The ventilation rate adjusting device 400 with a rotary-cover-with-opening structure according to some embodiments of the disclosure has been described above with reference to FIGS. 7A to 7D. However, those skilled in the art will appreciate that the rotary-cover-with-opening structure of the disclosure is not limited thereto. Hereinafter, a ventilation rate adjusting device with a rotary-cover-with-opening structure according to some embodiments of the disclosure will be described.

Figure 8:
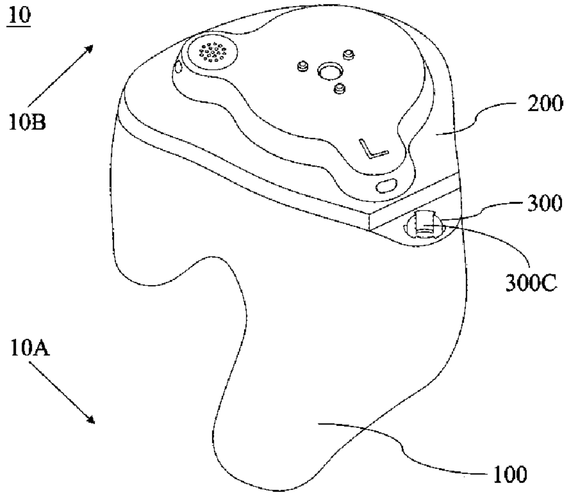
FIG. 8 shows a perspective view of an in-ear wireless earphone according to some embodiments of the disclosure.

In some embodiments, unlike the embodiments shown in FIGS. 7A to 7D, the base 620 may not have an annular portion. Thus, the opening 621 of the base 620 is formed by being surrounded by the adjacent connecting portions 623 and the inner wall of the ventilation hole 300. FIG. 8 shows a perspective view of an in-ear wireless earphone according to some embodiments of the disclosure. In some embodiments, as shown in FIG. 8, the ventilation hole 300 includes a clamping slot for receiving the connecting portion 623 (not shown in FIG. 8) of the base 620. When the base 620 of the ventilation rate adjusting device 400 is disposed in the ventilation hole 300, the connecting portion 623 of the base 620 is at least partially located in the corresponding clamping slot. Thus, the base 620 can be more stably disposed in the ventilation hole 300, which prevents the base 620 from rotating, and facilitates the rotation of the electrically operated rotary cover 610 relative to the base 620.

As described above, the pin 650 is fixedly connected to (e.g., integrally formed with) the rotary cover fixing member 640, and then connected to the rotary cover 610. However, the disclosure is not limited thereto. In some embodiments, the pin 650 may be fixedly connected to (e.g., integrally formed with) the rotary cover 610 before being connected to the rotary cover fixing member 640. For example, the pin 650 and the rotary cover 610 may be connected to each other by an adhesive, threads, or the like or integrally formed.

One-Way Valve Structure

Figure 9A:
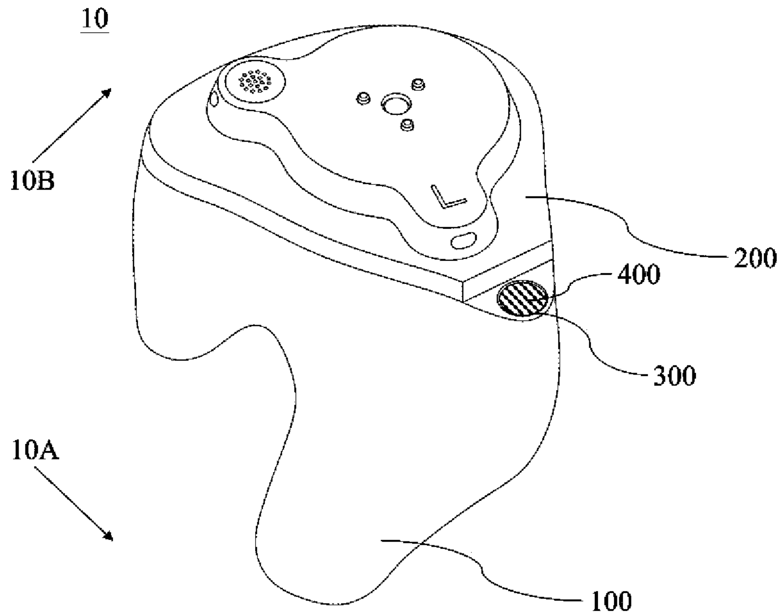
FIG. 9A shows a perspective view of an in-ear wireless earphone according to some embodiments of the disclosure.
Figure 9B:
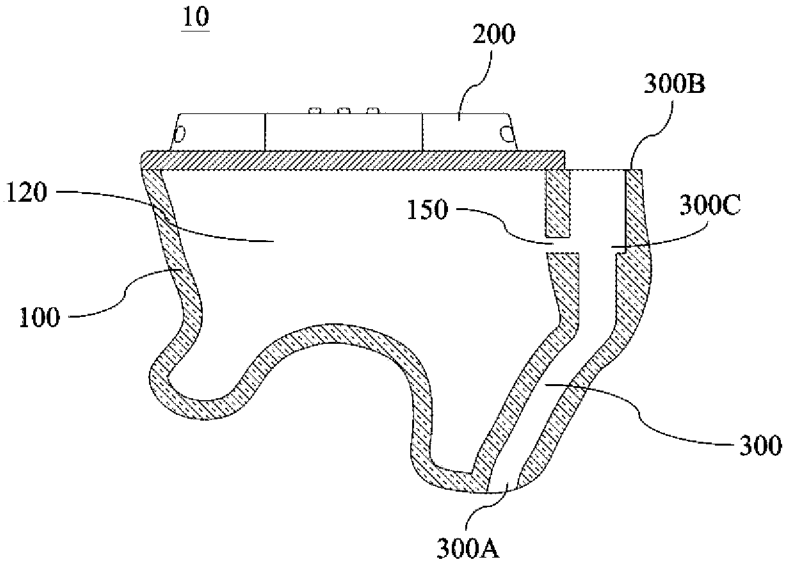
FIG. 9B shows a cross-sectional view of an in-ear wireless earphone according to some embodiments of the disclosure.
Figure 9C:
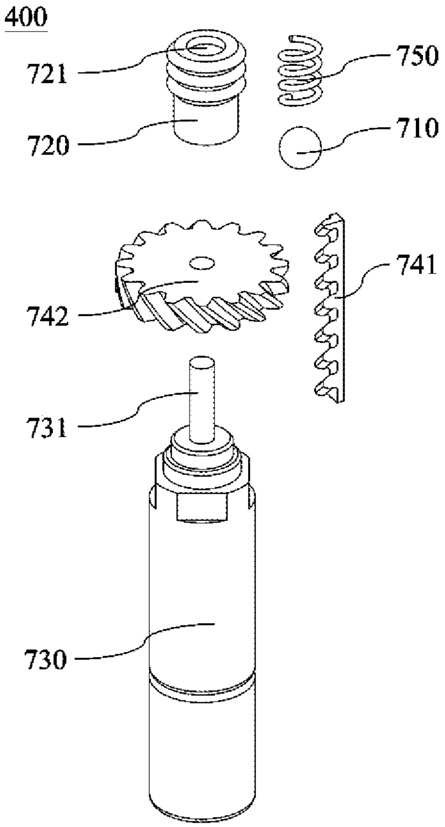
FIG. 9C shows an exploded view of a ventilation rate adjusting device of an in-ear wireless earphone according to some embodiments of the disclosure.
Figure 9D:
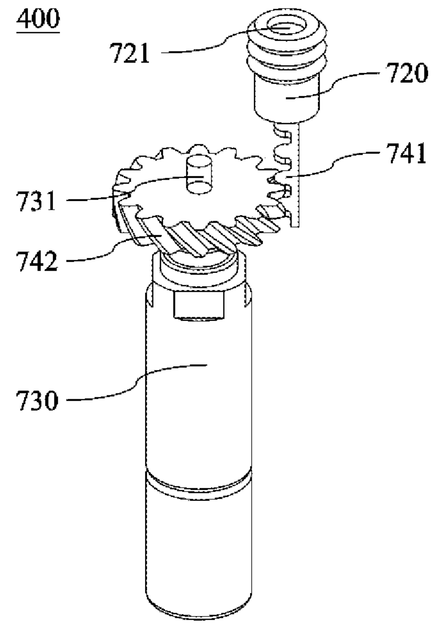
FIG. 9D shows a schematic view of a ventilation rate adjusting device according to some embodiments of the disclosure.
Figure 9E:
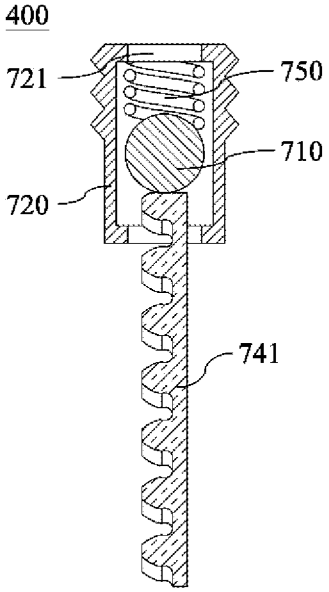
FIG. 9E shows a partial cross-sectional view of a ventilation rate adjusting device in an open state according to some embodiments of the disclosure.
Figure 9F:
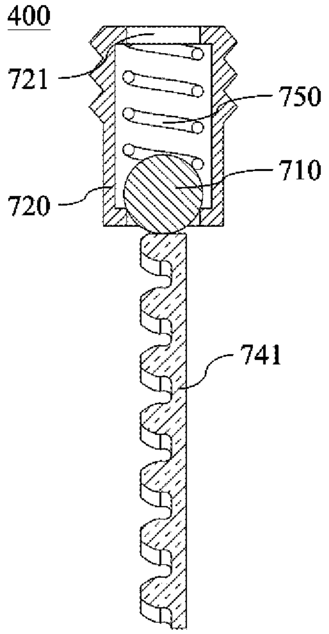
FIG. 9F shows a partial cross-sectional view of a ventilation rate adjusting device in a closed state according to some embodiments of the disclosure.

According to some embodiments of the disclosure, the ventilation rate adjusting device may adopt a one-way valve structure. FIG. 9A shows a perspective view of an in-ear wireless earphone according to some embodiments of the disclosure. FIG. 9B shows a cross-sectional view of an in-ear wireless earphone according to some embodiments of the disclosure. FIG. 9C shows an exploded view of a ventilation rate adjusting device of an in-ear wireless earphone according to some embodiments of the disclosure. FIG. 9D shows a schematic view of a ventilation rate adjusting device according to some embodiments of the disclosure. FIG. 9E shows a partial cross-sectional view of a ventilation rate adjusting device in an open state according to some embodiments of the disclosure. FIG. 9F shows a partial cross-sectional view of a ventilation rate adjusting device in a closed state according to some embodiments of the disclosure.

As shown in FIG. 9A, the in-ear wireless earphone 10 includes a customized housing 100, a panel 200 and a ventilation hole 300. As shown in FIG. 9B, the ventilation hole 300 of the in-ear wireless earphone 10 is disposed in the customized housing 100, and includes a mounting position 300C for mounting a ventilation rate adjusting device 400 (not shown in FIG. 9B). In an exemplary embodiment, as shown in FIG. 9B, the mounting position 300C is set at a second orifice 300B of the ventilation hole 300. In some embodiments, the mounting position 300C is set in the ventilation hole 300 at a position spaced apart from both a first orifice 300A and the second orifice 300B, i.e., at a middle position of the ventilation hole 300. In the embodiments shown in FIGS. 9A to 9F, please refer to the foregoing descriptions for other components and structures of the in-ear wireless earphone 10, which will not be repeated here.

According to some embodiments of the disclosure, as shown in FIGS. 9C to 9F, the ventilation rate adjusting device 400 includes a valve core 710 as the movable portion, a valve seat 720 as the fixed portion, and a motor 730 as the electric actuator. The valve seat 720 includes a fluid channel 721 communicated with the ventilation hole. The valve core 710 is movable relative to the valve seat 720 to open and close the fluid channel 721 or adjust the opening degree of the ventilation channel.

According to some embodiments of the disclosure, the ventilation rate adjusting device 400 further includes a first engagement portion 741 engaged with the valve core 710 and a second engagement portion 742 which is connected with an output shaft 731 of the motor 730 in a non-rotatable way. The first engagement portion 741 and the second engagement portion 742 are connected with each other in a transmission way. In some embodiments, as shown in FIGS. 9C and 9D, the first engagement portion 741 and the second engagement portion 742 are toothed engagement portions, respectively, wherein the first engagement portion 741 and the second engagement portion 742 are meshed with each other. In an exemplary embodiment, the first engagement portion 741 is a helical rack and the second engagement portion 742 is a helical spur gear. However, the disclosure is not limited thereto. In other embodiments, the first engagement portion 741 and the second engagement portion 742 may be other types of toothed engagement portions as long as they can be meshed with each other to drive the valve core 710 to move.

In some embodiments, the first engagement portion 741 and the valve core 710 are independent components. However, the disclosure is not limited thereto. In some embodiments, the first engagement portion 741 and the valve core 710 may be fixedly connected to each other. For example, the first engagement portion 741 and the valve core 710 may be connected to each other by an adhesive, threads, or the like. In some embodiments, the first engagement portion 741 and the valve core 710 may be integrally formed.

In some embodiments, as shown in FIGS. 9C, 9E and 9F, the ventilation rate adjusting device 400 further includes a spring 750. The spring 750 is disposed to apply an elastic force to the valve core 710. When the motor 730 applies a pressure to the valve core 710, the pressure can resist the elastic force of the spring 750, so that the valve core 710 approaches or moves away from the valve seat 720, thereby closing or opening the fluid channel 721.

In some embodiments, as shown in FIGS. 9C to 9F, a moving direction of the valve core 710 is substantially parallel to an extending direction of the ventilation hole 300 at the ventilation rate adjusting device 400. However, the disclosure is not limited thereto. In some embodiments, the moving direction of the valve core 710 is intersected with, e.g., substantially perpendicular to, the extending direction of the ventilation hole 300 at the ventilation rate adjusting device 400.

In some embodiments, as shown in FIG. 9B, the customized housing 110 includes a window 150 facing the inner cavity 120, and a power line (not shown) of the motor 730 may be electrically connected to a battery (not shown) of the in-ear wireless earphone 10 through the window 150. In some embodiments, the motor 730 of the ventilation rate adjusting device 400 may be arranged in the inner cavity 120 of the housing wall 110 through the window 150.

According to some embodiments of the disclosure, the ventilation rate adjusting device 400 may adjust the ventilation rate of the ventilation channel by using the motor 730 to drive the valve core 710 to move relative to the valve seat 720. Specifically, when the motor 730 is energized, the output shaft 731 of the motor 730 and the second engagement portion part 742 rotate to drive the first engagement portion part 741 and the valve core 710 to move relative to the valve seat 720, so that the valve core 710 approaches or moves away from the valve seat 720, thereby opening or closing the ventilation channel or adjusting the opening degree thereof.

Aperture Structure

Figure 10A:
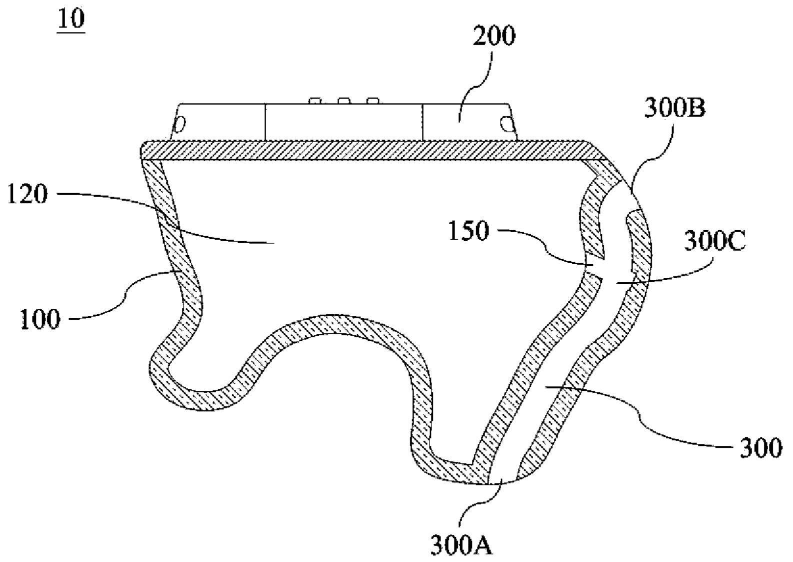
FIG. 10A shows a cross-sectional view of an in-ear wireless earphone according to some embodiments of the disclosure.
Figure 10B:
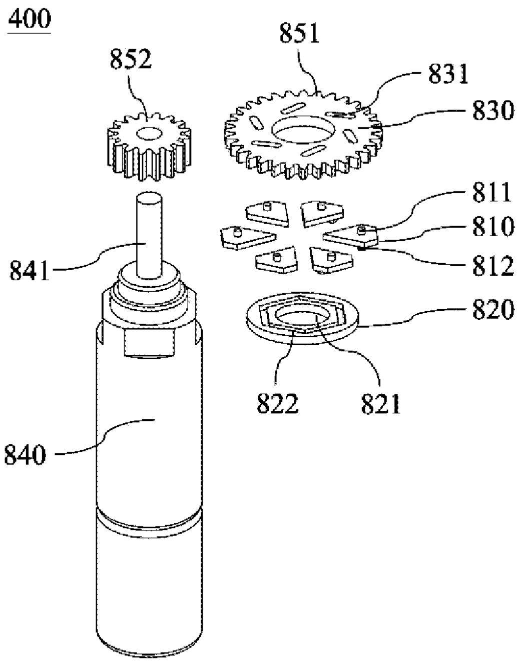
FIG. 10B shows an exploded view of a ventilation rate adjusting device of an in-ear wireless earphone according to some embodiments of the disclosure.
Figure 10C:
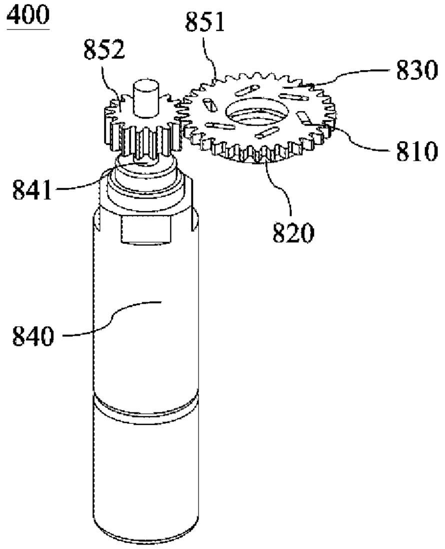
FIG. 10C shows a schematic view of a ventilation rate adjusting device in an open state according to some embodiments of the disclosure.
Figure 10D:
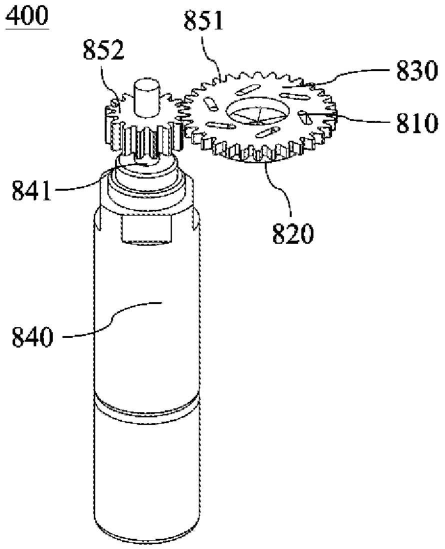
FIG. 10D shows a schematic view of a ventilation rate adjusting device in a closed state according to some embodiments of the disclosure.

According to some embodiments of the disclosure, the ventilation rate adjusting device may adopt an aperture structure. FIG. 10A shows a cross-sectional view of an in-ear wireless earphone according to some embodiments of the disclosure. FIG. 10B shows an exploded view of a ventilation rate adjusting device of an in-ear wireless earphone according to some embodiments of the disclosure. FIG. 10C shows a schematic view of a ventilation rate adjusting device in an open state according to some embodiments of the disclosure. FIG. 10D shows a schematic view of a ventilation rate adjusting device in a closed state according to some embodiments of the disclosure.

As shown in FIG. 10A, the in-ear wireless earphone 10 includes a customized housing 100, a panel 200 and a ventilation hole 300. The ventilation hole 300 of the in-ear wireless earphone 10 is disposed in the customized housing 100, and includes a mounting position 300C for mounting a ventilation rate adjusting device 400 (not shown in FIG. 10A). In an exemplary embodiment, as shown in FIG. 10A, the mounting position 300C is set in the ventilation hole 300 at a position spaced apart from both a first orifice 300A and a second orifice 300B, i.e., at a middle position of the ventilation hole 300. In some embodiments, the mounting position 300C may be set at the second orifice 300B of the ventilation hole 300. In the embodiments shown in FIGS. 10A to 10D, please refer to the foregoing descriptions for other components and structures of the in-ear wireless earphone 10, which will not be repeated here.

According to some embodiments of the disclosure, as shown in FIGS. 10B to 10D, the ventilation rate adjusting device 400 includes a plurality of blades 810 as the movable portion, a fixed seat 820 as the fixed portion, a rotary ring 830 and a motor 840 as the electric actuator. The fixed seat 820 includes a fluid channel 821 communicated with the ventilation hole 300. The rotary ring 830 is rotatable relative to the fixed seat 820. The motor 840 may drive the rotary ring 830 to rotate, thereby driving the blade 810 to move relative to the fixed seat 820. By the rotation of the rotary ring 830 relative to the fixed seat 820, the blades 810 may be spliced with each other to close, or separated from each other to open, the fluid channel 821 of the fixed seat 820, thereby adjusting the ventilation rate of the ventilation channel.

In an exemplary embodiment, as shown in FIG. 10B, the blade 810 includes a first protrusion 811 protruding from one surface and a second protrusion 812 protruding from the other surface, the rotary ring 830 includes a driving groove 831 for matching with the first protrusion 811, and the fixed seat 820 includes a sliding groove 822 for matching with the second protrusion 812. When the rotary ring 830 rotates relative to the fixed seat 820, the first protrusion 811 of the blade 810 moves in the driving groove 831, and the second protrusion 812 moves in the sliding groove 822.

According to some embodiments of the disclosure, the ventilation rate adjusting device 400 further includes a first engagement portion 851 which is connected with the rotary ring 830 in a non-rotatable way and a second engagement portion 852 which is connected with an output shaft 841 of the motor 840 in a non-rotatable way. The first engagement portion 851 and the second engagement portion 852 are connected with each other in a transmission way. In an exemplary embodiment, as shown in FIGS. 10B to 10D, the first engagement portion 851 and the second engagement portion 852 are toothed engagement portions, respectively. In some embodiments, the first engagement portion 851 and the second engagement portion 852 are both straight spur gears. However, the disclosure is not limited thereto. In other embodiments, the first engagement portion 851 and the second engagement portion 852 may be other types of toothed engagement portions as long as they can be meshed with each other to drive the rotary ring 830 to rotate.

In some embodiments, as shown in FIG. 10B, the first engagement portion 851 is integrally formed with the rotary ring 830. However, the disclosure is not limited thereto. In some embodiments, the first engagement portion 851 and the rotary ring 830 may be formed separately and connected together. For example, the first engagement portion 851 and the rotary ring 830 may be connected to each other by an adhesive, threads, or the like.

In an exemplary embodiment, a rotation axis of the rotary ring 830 is substantially parallel to an extending direction of the ventilation hole 300 at the ventilation rate adjusting device 400. However, the disclosure is not limited thereto. In some embodiments, the rotation axis of the rotary ring 830 is intersected with, e.g., substantially perpendicular to, the extending direction of the ventilation hole 300 at the ventilation rate adjusting device 400.

In some embodiments, as shown in FIG. 10A, the customized housing 110 includes a window 150 facing the inner cavity 120, and a power line (not shown) of the motor 840 may be electrically connected to a battery (not shown) of the in-ear wireless earphone 10 through the window 150. In some embodiments, the motor 840 of the ventilation rate adjusting device 400 may be arranged in the inner cavity 120 of the housing wall 110 through the window 150.

According to some embodiments of the disclosure, the ventilation rate adjusting device 400 may adjust the ventilation rate of the ventilation channel by using the motor 840 to drive and rotate the rotary ring 830 relative to the fixed seat 820 so as to move the blades 810 relative to the fixed seat 820. Specifically, when the motor 840 is energized, the output shaft 841 of the motor 840 and the second engagement portion 852 rotate to drive the first engagement portion 851 and the rotary ring 830 to rotate, so that the blades 810 move relative to the fixed seat 820, thereby opening or closing the ventilation channel or adjusting the opening degree thereof.

Plug Structure

Figure 11A:
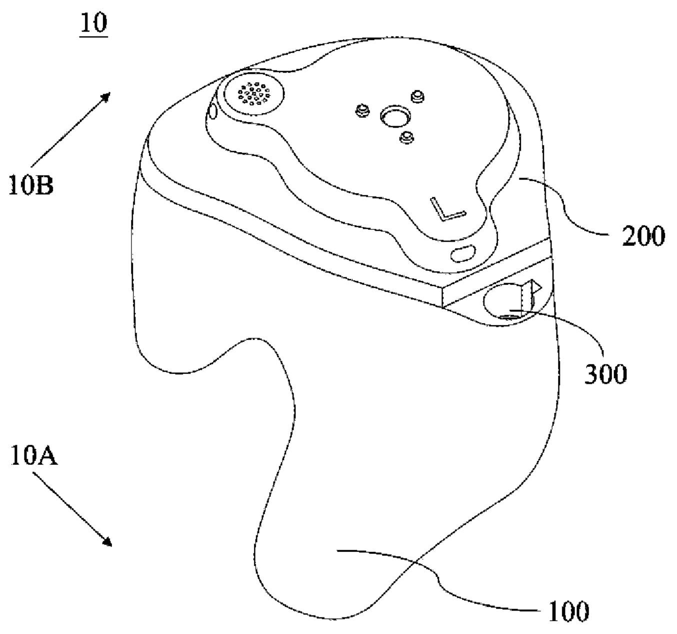
FIG. 11A shows a perspective view of an in-ear wireless earphone according to some embodiments of the disclosure.
Figure 11B:
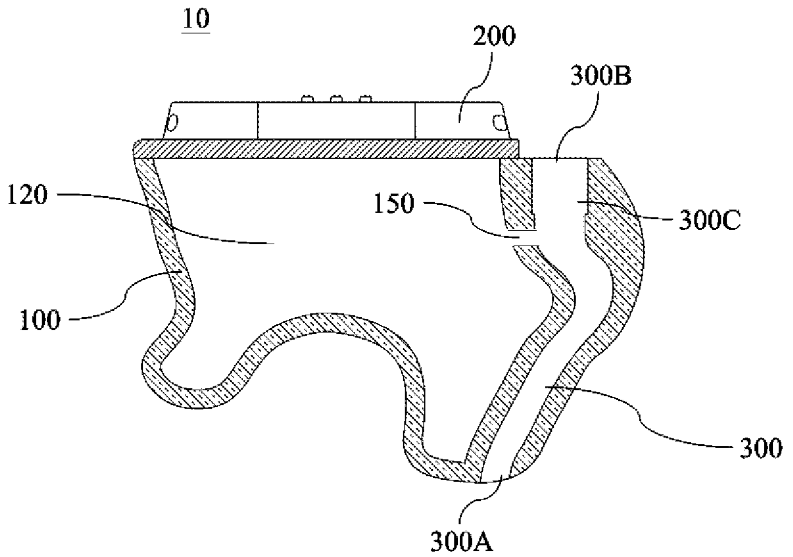
FIG. 11B shows a cross-sectional view of an in-ear wireless earphone according to some embodiments of the disclosure.
Figure 11C:
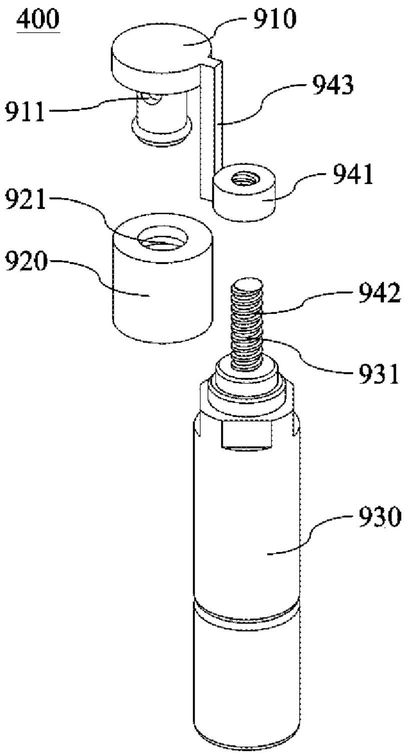
FIG. 11C shows an exploded view of a ventilation rate adjusting device of an in-ear wireless earphone according to some embodiments of the disclosure.
Figure 11D:
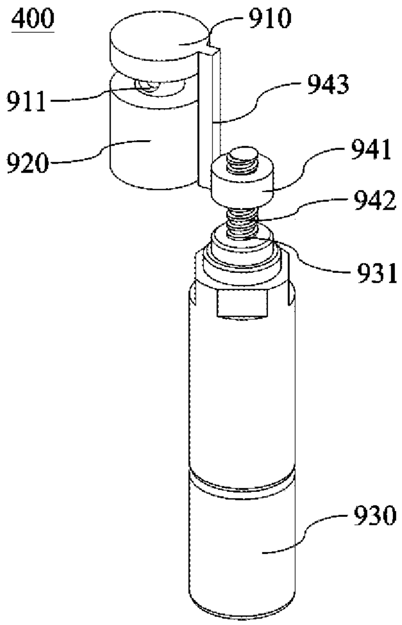
FIG. 11D shows a schematic view of a ventilation rate adjusting device in an open state according to some embodiments of the disclosure.
Figure 11E:
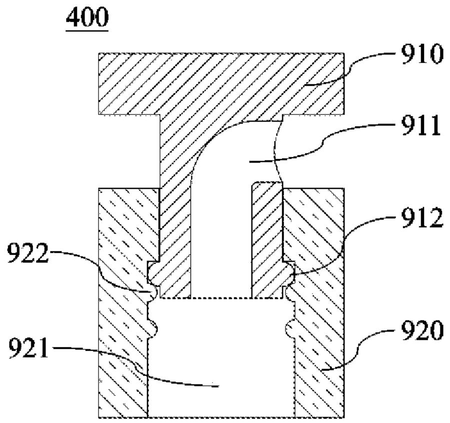
FIG. 11E shows a partial cross-sectional view of a ventilation rate adjusting device in an open state according to some embodiments of the disclosure.
Figure 11F:
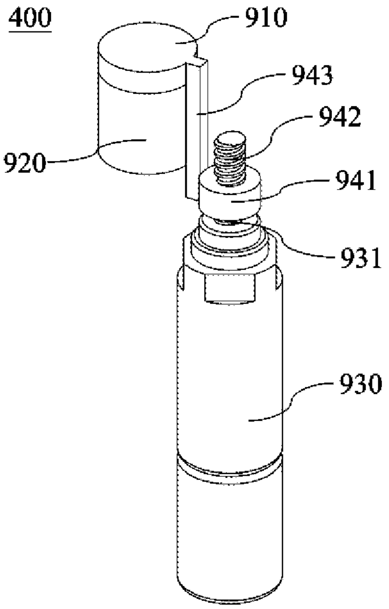
FIG. 11F shows a schematic view of a ventilation rate adjusting device in a closed state according to some embodiments of the disclosure.
Figure 11G:
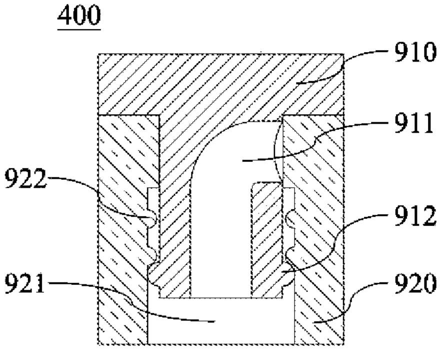
FIG. 11G shows a partial cross-sectional view of a ventilation rate adjusting device in a closed state according to some embodiments of the disclosure.
Figure 11H:
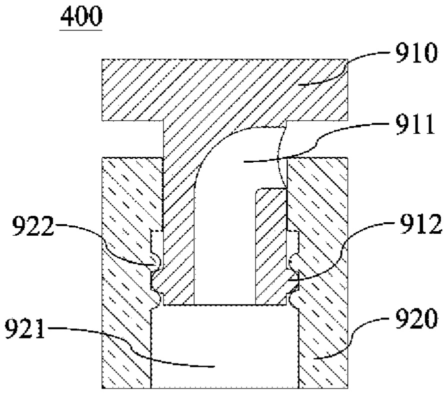
FIG. 11H shows a partial cross-sectional view of a ventilation rate adjusting device in a partially open state according to some embodiments of the disclosure.

According to some embodiments of the disclosure, the ventilation rate adjusting device may adopt a plug structure. FIG. 11A shows a perspective view of an in-ear wireless earphone according to some embodiments of the disclosure. FIG. 11B shows a cross-sectional view of an in-ear wireless earphone according to some embodiments of the disclosure. FIG. 11C shows an exploded view of a ventilation rate adjusting device of an in-ear wireless earphone according to some embodiments of the disclosure. FIG. 11D shows a schematic view of a ventilation rate adjusting device in an open state according to some embodiments of the disclosure. FIG. 11E shows a partial cross-sectional view of a ventilation rate adjusting device in an open state according to some embodiments of the disclosure. FIG. 11F shows a schematic view of a ventilation rate adjusting device in a closed state according to some embodiments of the disclosure. FIG. 11G shows a partial cross-sectional view of a ventilation rate adjusting device in a closed state according to some embodiments of the disclosure. FIG. 11H shows a partial cross-sectional view of a ventilation rate adjusting device in a partially open state according to some embodiments of the disclosure.

As shown in FIG. 11A, the in-ear wireless earphone 10 includes a customized housing 100, a panel 200 and a ventilation hole 300. As shown in FIG. 11B, the ventilation hole 300 of the in-ear wireless earphone 10 is disposed in the customized housing 100, and includes a mounting position 300C for mounting a ventilation rate adjusting device 400 (not shown in FIG. 11B). In an exemplary embodiment, as shown in FIG. 11B, the mounting position 300C is set at a second orifice 300B of the ventilation hole 300. In some embodiments, the ventilation rate adjusting device 400 may be mounted in the ventilation hole 300 at a position spaced apart from both a first orifice 300A and the second orifice 300B, i.e., at a middle position of the ventilation hole 300. In the embodiments shown in FIGS. 11A to 11H, please refer to the foregoing descriptions for other components and structures of the in-ear wireless earphone 10, which will not be repeated here.

According to some embodiments of the disclosure, as shown in FIGS. 11C to 11H, the ventilation rate adjusting device 400 includes a plug member 910 as the movable portion, a plug seat 920 as the fixed portion, and a motor 930 as the electric actuator. The plug seat 920 includes a fluid channel 921 communicated with the ventilation hole 300. The plug seat 920 is fixed in the ventilation hole 300 of the in-ear wireless earphone 10. In an exemplary embodiment, the plug seat 920 is an independent mounting seat, i.e., formed separately from the customized housing 100. The plug member 910 may move relative to the plug seat 920 to close or open the fluid channel 921 of the plug seat 920, thereby opening or closing the ventilation channel or adjusting the ventilation rate thereof.

According to some embodiments of the disclosure, the plug member 910 may move linearly relative to the plug seat 920. In an exemplary embodiment, a moving direction of the plug member 910 is substantially parallel to an extending direction of the ventilation hole 300 at the ventilation rate adjusting device 400. In an exemplary embodiment, as shown in FIGS. 11C to 11H, the plug member 910 may be inserted into or pulled out of the plug seat 920.

In some embodiments, as shown in FIGS. 11C to 11H, the plug member 910 includes a fluid channel 911. The fluid channel 911 of the plug member 910 may be configured to communicate the fluid channel 921 of the plug seat 920 with the external environment. When the plug member 910 is inserted into the plug seat 920, the fluid channel 911 of the plug member 910 is in fluid communication with the fluid channel 921 of the plug seat 920.

According to some embodiments of the disclosure, the ventilation rate adjusting device 400 further includes a first engagement portion 941 engaged with the plug member 910 and a second engagement portion 942 which is connected with an output shaft 931 of the motor 930 in a non-rotatable way. The first engagement portion 941 and the second engagement portion 942 are connected with each other in a transmission way. In an exemplary embodiment, as shown in FIG. 11C, the first engagement portion 941 includes internal threads, the second engagement portion 942 includes external threads, and the first engagement portion 941 and the second engagement portion 942 are threadedly engaged with each other. However, the disclosure is not limited thereto. In other embodiments, the first engagement portion 941 and the second engagement portion 942 may be other types of engagement portions, such as toothed engagement portions as long as they can be connected with each other in a transmission way to drive the plug member 910 to move.

In some embodiments, as shown in FIG. 11C, the first engagement portion 941 is fixedly connected to the plug member 910, for example, through a connecting member 943. However, the disclosure is not limited thereto. In some embodiments, the first engagement portion 941 and the plug member 910 are components independent from each other. For example, the plug member 910 may be movably supported by the first engagement portion 941 (e.g., through the connecting member 943) and move along with the movement of the first engagement portion 941.

In some embodiments, as shown in FIG. 11C, the second engagement portion 942 is integrally formed with the output shaft 931 of the motor 930, i.e., the second engagement portion 942 serves as external threads formed on the output shaft 931. However, the disclosure is not limited thereto. In some embodiments, the second engagement portion 942 and the output shaft 931 may be formed separately and fixedly connected together. For example, the second engagement portion 942 and the output shaft 931 may be connected to each other by an adhesive, threads, or the like.

In some embodiments, as shown in FIG. 11B, the customized housing 110 includes a window 150 facing the inner cavity 120, and a power line (not shown) of the motor 930 may be electrically connected to a battery (not shown) of the in-ear wireless earphone 10 through the window 150. In some embodiments, the motor 930 of the ventilation rate adjusting device 400 may be arranged in the inner cavity 120 of the housing wall 110 through the window 150.

According to some embodiments of the disclosure, the ventilation rate adjusting device 400 may adjust the ventilation rate of the ventilation channel by using the motor 930 to drive the plug member 910 to move relative to the plug seat 920. Specifically, when the motor 930 is energized, the output shaft 931 of the motor 930 and the second engagement portion 942 rotate to drive the first engagement portion 941 and the plug member 910 to move relative to the plug seat 920, so that the plug member 910 is inserted into or pulled out of the plug seat 920, thereby opening or closing the ventilation channel or adjusting the opening degree thereof.

In some embodiments, as shown in FIG. 11H, when the ventilation of the ventilation channel is achieved, the plug member 910 may be driven by the motor 930 to be partially, rather than completely, pulled out of the plug seat 920. Thus, in a process of gradually pulling out the plug member 910 from the plug seat 920, the plug member 910 can be kept at different positions relative to the plug seat 920, so as to achieve different degrees of ventilations. In some embodiments, as shown in FIGS. 11E, 11G and 11H, the plug member 910 includes a limiting portion 912, and the plug seat 920 includes a corresponding limiting portion 922. Thus, through a cooperation of the limiting portions 912 and 922, the plug member 910 can be limited at different levels relative to the plug seat 920, so as to achieve different degrees of ventilations more easily.

As described above, the ventilation adjust device 400 with a plug structure according to some embodiment of the disclosure includes an independent plug seat 920. However, the disclosure is not limited thereto. In some embodiments, the plug seat may be formed by the customized housing 100. In an exemplary embodiment, the plug seat is integrally formed with the customized housing 100. The plug member 910 may be inserted into or pulled out of the plug seat formed by the customized housing 100.

Figure 12A:
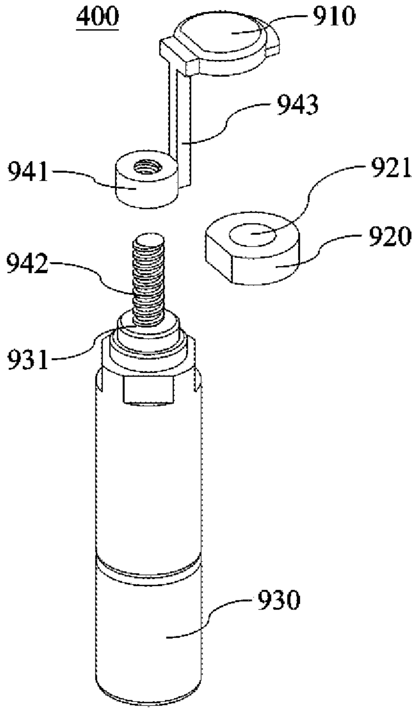
FIG. 12A shows an exploded view of a ventilation rate adjusting device of an in-ear wireless earphone according to some embodiments of the disclosure.
Figure 12B:
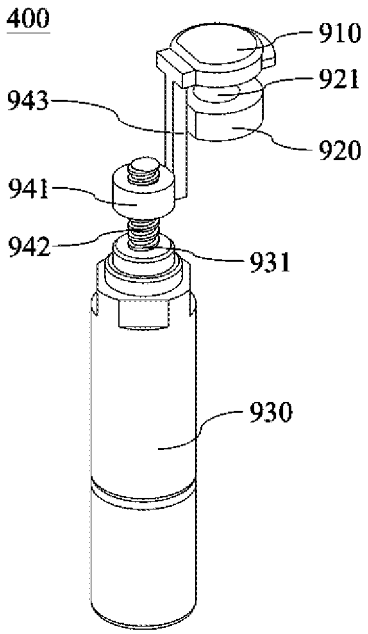
FIG. 12B shows a schematic view of a ventilation rate adjusting device in an open state according to some embodiments of the disclosure.
Figure 12C:
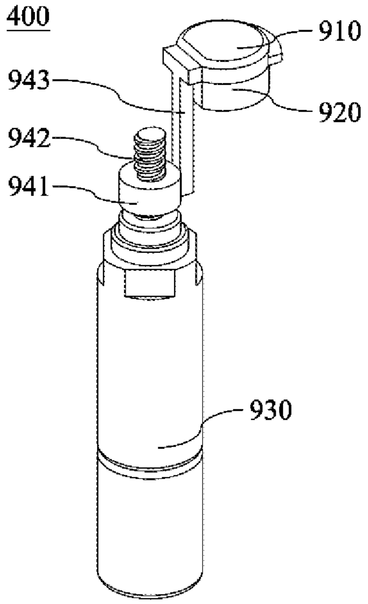
FIG. 12C shows a schematic view of a ventilation rate adjusting device in a closed state according to some embodiments of the disclosure.

As described above, the plug member 910 of the ventilation rate adjusting device 400 according to some embodiments of the disclosure is disposed to be inserted into or pulled out of the plug seat 920. However, the disclosure is not limited thereto. FIG. 12A shows an exploded view of a ventilation rate adjusting device of an in-ear wireless earphone according to some embodiments of the disclosure. FIG. 12B shows a schematic view of a ventilation rate adjusting device in an open state according to some embodiments of the disclosure. FIG. 12C shows a schematic view of a ventilation rate adjusting device in a closed state according to some embodiments of the disclosure. As shown in FIGS. 12A to 12C, the plug member 910 is disposed in the form of a cover, which may be moved to cover the plug seat 920 or removed therefrom, without being inserted into or pulled out of the plug seat 920. When the motor 930 is energized, the output shaft 931 of the motor 930 and the second engagement portion 942 rotate to drive the first engagement portion 941 and the plug member 910 to move relative to the plug seat 920, so that the plug member 910 moves away from or approaches the plug seat 920, thereby opening or closing the ventilation channel or adjusting the opening degree thereof.

As described above, the moving direction of the plug member 910 is substantially parallel to the extending direction of the ventilation hole 300 at the ventilation rate adjust device 400. However, the disclosure is not limited thereto. Hereinafter, a ventilation rate adjusting device with a plug structure according to some embodiments of the disclosure will be described in detail with reference to the drawings.

Figure 13A:
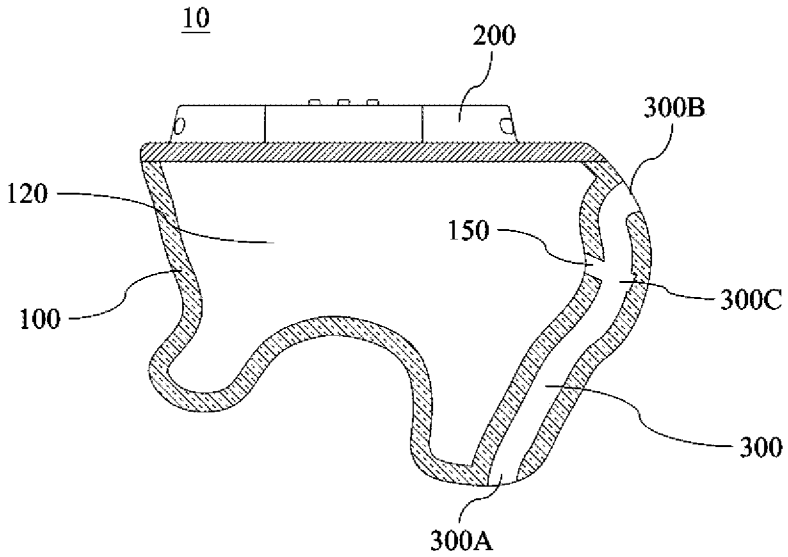
FIG. 13A shows a cross-sectional view of an in-ear wireless earphone according to some embodiments of the disclosure.
Figure 13B:
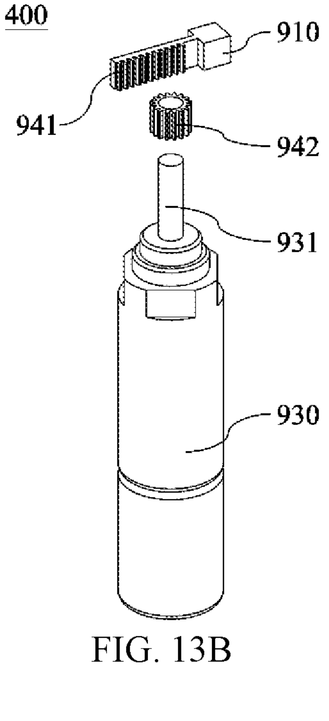
FIG. 13B shows an exploded view of a ventilation rate adjusting device of an in-ear wireless earphone according to some embodiments of the disclosure.
Figure 13C:
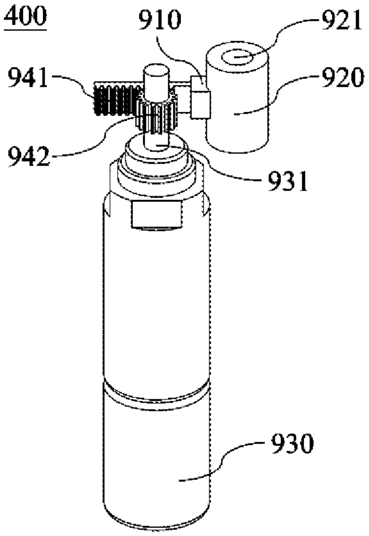
FIG. 13C shows a schematic view of a ventilation rate adjusting device in an open state according to some embodiments of the disclosure.
Figure 13D:
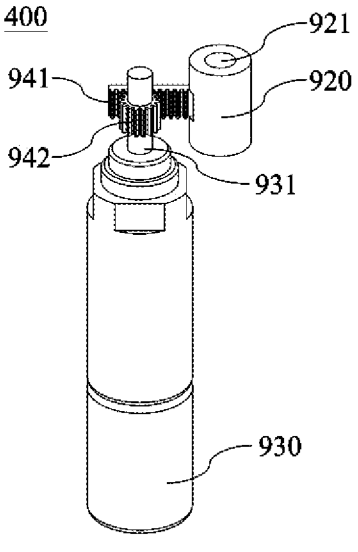
FIG. 13D shows a schematic view of a ventilation rate adjusting device in a closed state according to some embodiments of the disclosure.

FIG. 13A shows a cross-sectional view of an in-ear wireless earphone according to some embodiments of the disclosure. FIG. 13B shows an exploded view of a ventilation rate adjusting device of an in-ear wireless earphone according to some embodiments of the disclosure. FIG. 13C shows a schematic view of a ventilation rate adjusting device in an open state according to some embodiments of the disclosure. FIG. 13D shows a schematic view of a ventilation rate adjusting device in a closed state according to some embodiments of the disclosure.

As shown in FIG. 13A, the in-ear wireless earphone 10 includes a customized housing 100, a panel 200 and a ventilation hole 300. The ventilation hole 300 of the in-ear wireless earphone 10 is disposed in the customized housing 100, and includes a mounting position 300C for mounting a ventilation rate adjusting device 400 (not shown in FIG. 13A). In an exemplary embodiment, as shown in FIG. 13A, the ventilation rate adjusting device 400 may be mounted in the ventilation hole 300 at a position spaced apart from both a first orifice 300A and a second orifice 300B, i.e., at a middle position of the ventilation hole 300. In some embodiments, the mounting position 300C is disposed at the second orifice 300B of the ventilation hole 300. In the embodiments shown in FIGS. 13A to 13D, please refer to the foregoing descriptions for other components and structures of the in-ear wireless earphone 10, which will not be repeated here.

According to some embodiments of the disclosure, as shown in FIGS. 13B to 13D, the ventilation rate adjusting device 400 includes a plug member 910 as the movable portion, a plug seat 920 as the fixed portion, and a motor 930 as the electric actuator. The plug seat 920 includes a fluid channel 921 communicated with the ventilation hole 300. The plug seat 920 is fixed in the ventilation hole 300 of the in-ear wireless earphone 10. In an exemplary embodiment, the plug seat 920 is an independent mounting seat, i.e., formed separately from the customized housing 100. The plug member 910 may move relative to the plug seat 920 to close or open the fluid channel 921 of the plug seat 920, thereby opening or closing the ventilation channel or adjusting the ventilation rate thereof.

According to some embodiments of the disclosure, the plug member 910 may move linearly relative to the plug seat 920. In an exemplary embodiment, the moving direction of the plug member 910 is intersected with, e.g., substantially perpendicular to, the extending direction of the ventilation hole 300 at the ventilation rate adjusting device 400. In an exemplary embodiment, as shown in FIGS. 13C and 13D, the plug member 910 may be inserted into or removed out of the plug seat 920.

According to some embodiments of the disclosure, the ventilation rate adjusting device 400 further includes a first engagement portion 941 engaged with the plug member 910 and a second engagement portion 942 which is connected with the output shaft 931 of the motor 930 in a non-rotatable way. The first engagement portion 941 and the second engagement portion 942 are connected with each other in a transmission way. In some embodiments, as shown in FIG. 13B, the first engagement portion 941 is fixedly connected to, e.g., integrally formed with the plug member 910. In an exemplary embodiment, as shown in FIGS. 13B to 13D, the first engagement portion 941 is a rack, second engagement portion 942 is a gear, and the first engagement portion 941 and the second engagement portion 942 are meshed with each other. However, the disclosure is not limited thereto. In other embodiments, the first engagement portion 941 and the second engagement portion 942 may be other types of engagement portions as long as they can be connected with each other in a transmission way to drive the plug member 910 to move.

According to some embodiments of the disclosure, the ventilation rate adjusting device 400 may adjust the ventilation rate of the ventilation channel by using the motor 930 to drive the plug member 910 to move relative to the plug seat 920. Specifically, when the motor 930 is energized, the output shaft 931 of the motor 930 and the second engagement portion 942 rotate to drive the first engagement portion 941 and the plug member 910 to move relative to the plug seat 920, so that the plug member 910 is inserted into or pulled out of the plug seat 920, thereby opening or closing the ventilation channel or adjusting the opening degree thereof.

In the embodiments shown in FIGS. 13A to 13D, please refer to the foregoing descriptions for other structures of the ventilation rate adjusting device 400, which will not be repeated here.

Figure 14A:
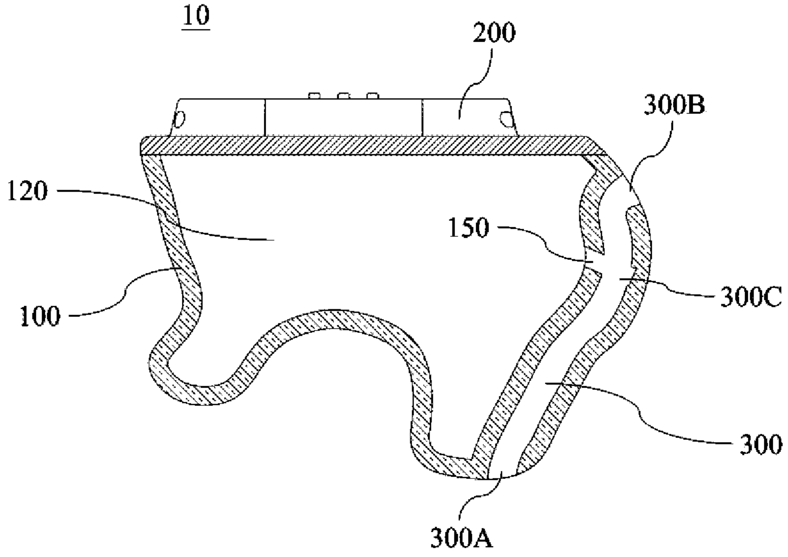
FIG. 14A shows a cross-sectional view of an in-ear wireless earphone according to some embodiments of the disclosure.
Figure 14B:
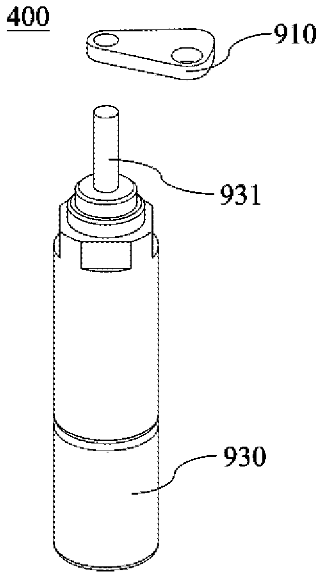
FIG. 14B shows an exploded view of a ventilation rate adjusting device of an in-ear wireless earphone according to some embodiments of the disclosure.
Figure 14C:
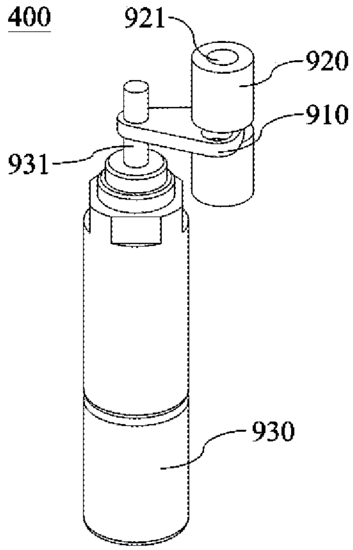
FIG. 14C shows a schematic view of a ventilation rate adjusting device in an open state according to some embodiments of the disclosure.
Figure 14D:
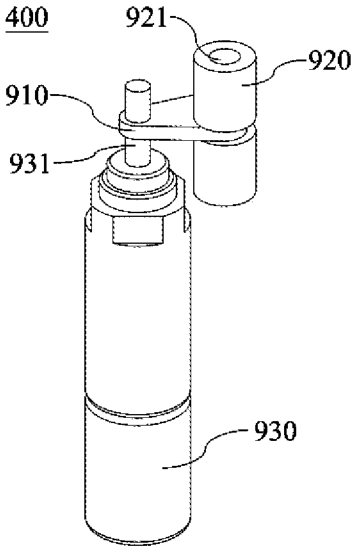
FIG. 14D shows a schematic view of a ventilation rate adjusting device in a closed state according to some embodiments of the disclosure.

FIG. 14A shows a cross-sectional view of an in-ear wireless earphone according to some embodiments of the disclosure. FIG. 14B shows an exploded view of a ventilation rate adjusting device of an in-ear wireless earphone according to some embodiments of the disclosure. FIG. 14C shows a schematic view of a ventilation rate adjusting device in an open state according to some embodiments of the disclosure. FIG. 14D shows a schematic view of a ventilation rate adjusting device in a closed state according to some embodiments of the disclosure.

As shown in FIG. 14A, the in-ear wireless earphone 10 includes a customized housing 100, a panel 200 and a ventilation hole 300. The ventilation hole 300 of the in-ear wireless earphone 10 is disposed in the customized housing 100, and includes a mounting position 300C for mounting a ventilation rate adjusting device 400 (not shown in FIG. 14A). In an exemplary embodiment, as shown in FIG. 14A, the ventilation rate adjusting device 400 may be mounted in the ventilation hole 300 at a position spaced apart from both a first orifice 300A and a second orifice 300B, i.e., at a middle position of the ventilation hole 300. In some embodiments, the mounting position 300C is disposed at the second orifice 300B of the ventilation hole 300. In the embodiments shown in FIGS. 14A to 14D, please refer to the foregoing descriptions for other components and structures of the in-ear wireless earphone 10, which will not be repeated here.

According to some embodiments of the disclosure, as shown in FIGS. 14B to 14D, the ventilation rate adjusting device 400 includes a plug member 910 as the movable portion, a plug seat 920 as the fixed portion, and a motor 930 as the electric actuator. The plug seat 920 includes a fluid channel 921 communicated with the ventilation hole 300. The plug seat 920 is fixed in the ventilation hole 300 of the in-ear wireless earphone 10. In an exemplary embodiment, the plug seat 920 is an individual mounting seat, i.e., formed separately from the customized housing 100. The plug member 910 may move relative to the plug seat 920 to close or open the fluid channel 921 of the plug seat 920, thereby opening or closing the ventilation channel or adjusting the ventilation rate thereof.

As described above, the plug member 910 moves linearly relative to the plug seat 920. However, the disclosure is not limited thereto. In some embodiments, unlike the embodiments shown in FIGS. 11A to 13D, the plug member 910 may rotate relative to the plug seat 920 as shown in FIGS. 14B to 14D. In an exemplary embodiment, a rotation plane of the plug member 910 is intersected with, e.g., substantially perpendicular to, the extending direction of the ventilation hole 300 at the ventilation rate adjusting device 400. In an exemplary embodiment, as shown in FIGS. 14C and 14D, the plug member 910 may be rotatably inserted into the plug seat 920 or rotatably removed out of the plug seat 920.

According to some embodiments of the disclosure, the plug member 910 is connected with an output shaft 931 of the motor 930 in a transmission way. In an exemplary embodiment, as shown in FIGS. 14B to 14D, the plug member 910 is connected with the output shaft 931 of the motor 930 in a non-rotatable way. However, the disclosure is not limited thereto. In other embodiments, the plug member 910 and the output shaft 931 of the motor 930 may also be connected in a transmission way by other means, such as through an intermediate transmission gear, as long as they can be connected with each other in a transmission way to drive the plug member 910 to rotate relative to the plug seat 920.

According to some embodiments of the disclosure, the ventilation rate adjusting device 400 may adjust the ventilation rate of the ventilation channel by using the motor 930 to drive the plug member 910 to move relative to the plug seat 920. Specifically, when the motor 930 is energized, the output shaft 931 of the motor 930 rotates to drive the plug member 910 to rotate relative to the plug seat 920, so that the plug member 910 is inserted into or pulled out of the plug seat 920, thereby opening or closing the ventilation channel or adjusting the opening degree thereof.

In the embodiment shown in FIGS. 14A to 14D, please refer to the foregoing descriptions for other structures of the ventilation rate adjusting device 400, which will not be repeated here.

As described above, the ventilation hole 300 is completely disposed in the customized housing 100. However, the disclosure is not limited thereto. In some embodiments, the ventilation hole 300 of the in-ear wireless earphone 10 may include a first hole section located in the customized housing 100 and a second hole section located in the panel 200, wherein the ventilation channel includes a first section disposed in the customized housing 100 and a second section disposed in the panel 200. In this case, the ventilation rate adjusting device 400 according to the embodiment of the disclosure may be disposed in the second hole section of the ventilation hole 300 located in the panel 200.

The disclosure relates to an in-ear wearable device. The disclosure provides an in-ear wearable device, comprising: a customized housing having a housing wall and an inner cavity, the customized housing comprising a first portion before being inserted into an acoustic meatus of a user and matching with a shape of the acoustic meatus and a second portion for being exposed to an external environment when the first portion is inserted into the acoustic meatus; a panel mounted to the customized housing at an open end of the second portion away from the first portion; a ventilation hole at least partially disposed in the customized housing, wherein a section of the ventilation hole disposed in the customized housing is formed in the housing wall; and a ventilation rate adjusting device mounted in the ventilation hole, wherein the ventilation hole and the ventilation rate adjusting device constitute at least a part of a ventilation channel which is isolated from the inner cavity, the ventilation channel is configured to fluidly connect the acoustic meatus to the external environment when the user wears the in-ear wireless earphone, and electrically adjust a ventilation rate of the ventilation channel to adjust audio characteristics of the in-ear wearable device.

Although the disclosure has been described with reference to the exemplary embodiments, it shall be appreciated that the disclosure is not limited to the configurations and methods of the above embodiments. On the contrary, the disclosure is intended to cover various modifications and equivalent arrangements. In addition, although various elements and methodical steps of the disclosed invention are illustrated in various exemplary combinations and configurations, other combinations including more or less elements or methods shall also fall within the scope of the disclosure.

LIST OF THE REFERENCE SIGNS

10: in-ear wireless earphone;
10A: first side;
10B: second side;
100: customized housing;
110: housing wall;
120: inner cavity;
130: first protruding portion;
140: second protruding portion;
200: panel;
300: ventilation hole;
300A: first orifice;
300B: second orifice;
300C: mounting position;
400: ventilation rate adjusting device;
410: piston;
420: outer shell;
421: opening;
422: internal chamber;
430: electromagnetic unit;
431: electromagnetic coil;
432: power line;
433: stopper;
434: electromagnet;
435: magnetic restricting portion;
510: valve plate;
511: extending portion;
520: valve body;

521: opening;
530: motor;
531: output shaft;
540: valve plate fixing member;
551: first engagement portion;
552: second engagement portion;
610: rotary cover;
611: opening;
612: annular portion;
613: connecting portion;
620: base;
621: opening;
622: annular portion;
623: connecting portion;
630: motor;
631: output shaft;
640: rotary cover fixing member;
650: pin;
661: first engagement portion;
662: second engagement portion;
710: valve core;
720: valve seat;
721: fluid channel;
730: motor;
731: output shaft;
741: first engagement portion;
742: second engagement portion;
750: spring;
810: blade;
811: first protrusion;
812: second protrusion;
820: fixed seat;
821: fluid channel;
822: sliding groove;
830: rotary ring;
831: driving groove;
840: motor;
841: output shaft;
851: first engagement portion;
852: second engagement portion;
910: plug member;
911: fluid channel;
920: plug seat;
921: fluid channel;
930: motor;
931: output shaft;
941: first engagement portion;
942: second engagement portion; and
943: connecting member.

The invention claimed is:

1. An in-ear wearable device, comprising:
a customized housing having a housing wall and an inner cavity surrounded by the housing wall, wherein the customized housing comprises a first portion for being inserted into an acoustic meatus of a user and matching with a shape of the acoustic meatus, and a second portion for being exposed to an external environment when the first portion is inserted into the acoustic meatus;
a panel mounted to the customized housing at an open end of the second portion away from the first portion;
a ventilation hole at least partially disposed in the customized housing, wherein a section of the ventilation hole disposed in the customized housing is formed in the housing wall; and
a ventilation rate adjusting device mounted in the ventilation hole, wherein the ventilation hole and the ventilation rate adjusting device constitute at least a part of a ventilation channel which is isolated from the inner cavity of the customized housing, the ventilation channel is configured to fluidly connect the acoustic meatus of the user to the external environment when the user wears the in-ear wearable device, and the ventilation rate adjusting device is configured to electrically adjust a ventilation rate of the ventilation channel to adjust audio characteristics of the in-ear wearable device.

2. The in-ear wearable device according to claim 1, wherein the ventilation channel is completely disposed in the customized housing.

3. The in-ear wearable device according to claim 2, wherein the ventilation hole comprises a first orifice for being exposed to the acoustic meatus and a second orifice for being exposed to the external environment when the user wears the in-ear wearable device, and
the ventilation rate adjusting device is disposed at the second orifice of the ventilation hole; or
the ventilation rate adjusting device is disposed at a middle position of the ventilation hole spaced apart from both the first orifice and the second orifice.

4. The in-ear wearable device according to claim 3, wherein the ventilation channel is a bent channel.

5. The in-ear wearable device according to claim 3, wherein the customized housing has an integral structure.

6. The in-ear wearable device according to claim 3, wherein the ventilation rate adjusting device is disposed to be not exposed from an outer surface of the customized housing.

7. The in-ear wearable device according to claim 3, wherein the in-ear wearable device is an in-ear wireless earphone.

8. The in-ear wearable device according to claim 3, wherein the ventilation rate adjusting device is configured to be electrically operable to switch between a fully open state for fully opening the ventilation channel and a fully closed state for fully closing the ventilation channel.

9. The in-ear wearable device according to claim 8, wherein the ventilation rate adjusting device is configured to be electrically operable to be in a state of partially opening the ventilation channel; or
the ventilation rate adjusting device is further configured to be electrically operable to continuously adjust the ventilation rate of the ventilation channel.

10. The in-ear wearable device according to claim 3, wherein the ventilation rate adjusting device comprises a movable portion, a fixed portion and an electric actuator, and the electric actuator is configured to electrically drive the movable portion to move relative to the fixed portion to adjust the ventilation rate of the ventilation channel.

11. The in-ear wearable device according to claim 10, wherein the customized housing comprises a window facing the inner cavity, and the electric actuator is electrically connected to a battery of the in-ear wearable device through the window.

12. The in-ear wearable device according to claim 10, wherein the ventilation rate adjusting device adopts a butterfly valve structure, and comprises a valve plate as the movable portion, a valve body as the fixed portion and a motor as the electric actuator, the valve body comprises an opening communicated with the ventilation hole, the valve plate is disposed inside the valve body, and the ventilation rate adjusting device is configured to adjust the ventilation rate of the ventilation channel by using the motor to drive the valve plate to rotate in the valve body.

13. The in-ear wearable device according to claim 10, wherein the ventilation rate adjusting device adopts a rotary-cover-with-opening structure and comprises a rotary cover as the movable portion, a base as the fixed portion and a motor as the electric actuator, the rotary cover comprises an opening, the base comprises an opening, and the ventilation rate adjusting device is configured to adjust the ventilation rate of the ventilation channel by using the motor to drive the rotary cover to rotate relative to the base.

14. The in-ear wearable device according to claim 10, wherein the ventilation rate adjusting device adopts an electromagnetic valve structure and comprises a piston as the movable portion, an outer shell as the fixed portion and an electromagnetic unit as the electric actuator, the outer shell comprises an opening communicated with the ventilation hole, and the ventilation rate adjusting device is configured to adjust the ventilation rate of the ventilation channel by using the electromagnetic unit to drive the piston to move relative to the outer shell.

15. The in-ear wearable device according to claim 14, wherein the ventilation rate adjusting device comprises a connecting tube which connects the outer shell and the ventilation hole to isolate the ventilation channel from the inner cavity.

* * * * *